US012252096B2

(12) United States Patent
McNeely

(10) Patent No.: US 12,252,096 B2
(45) Date of Patent: Mar. 18, 2025

(54) VEHICLE STEP ASSEMBLY

(71) Applicant: N-FAB, INC., Ann Arbor, MI (US)

(72) Inventor: James Noah McNeely, Grayson, GA (US)

(73) Assignee: N-FAB, INC., Ann Arbor, MI (US)

( * ) Notice: Subject to any disclaimer, the term of this patent is extended or adjusted under 35 U.S.C. 154(b) by 326 days.

(21) Appl. No.: 17/842,849

(22) Filed: Jun. 17, 2022

(65) Prior Publication Data

US 2023/0009100 A1 Jan. 12, 2023

Related U.S. Application Data

(60) Provisional application No. 63/218,637, filed on Jul. 6, 2021.

(51) Int. Cl.
*B60R 3/00* (2006.01)
(52) U.S. Cl.
CPC ...................... *B60R 3/00* (2013.01)
(58) Field of Classification Search
CPC .......................................................... B60R 3/00
See application file for complete search history.

(56) References Cited

U.S. PATENT DOCUMENTS

| | | | | |
|---|---|---|---|---|
| 452,198 A * | 5/1891 | Schweiger | ................ | B60R 3/00 280/165 |
| 1,148,356 A * | 7/1915 | Chickering | ............... | B60R 3/02 280/166 |
| 1,702,691 A * | 2/1929 | Heberling | ............... | B62B 3/007 280/166 |
| 4,935,638 A * | 6/1990 | Straka | ..................... | B60R 19/42 297/75 |
| 5,052,515 A * | 10/1991 | Nowlan | .................... | E06C 7/16 182/121 |
| 5,456,479 A * | 10/1995 | Conger | ..................... | B60R 3/02 280/165 |
| 6,588,783 B2 | 7/2003 | Fichter | | |
| 6,874,801 B2 | 4/2005 | Fichter | | |
| 7,168,523 B1 * | 1/2007 | Tafoya | .................... | B60R 3/007 280/165 |
| 7,416,202 B2 | 8/2008 | Fichter | | |
| 7,717,444 B2 | 5/2010 | Fichter | | |
| 7,909,344 B1 | 3/2011 | Bundy | | |
| 10,011,231 B1 | 7/2018 | Wymore | | |
| 10,688,933 B2 | 6/2020 | Knichel | | |
| 2014/0326538 A1 * | 11/2014 | Najey | ....................... | E06C 7/08 182/129 |

(Continued)

FOREIGN PATENT DOCUMENTS

| | | | | |
|---|---|---|---|---|
| CA | 2369309 C | * | 12/2009 | ............. B60R 3/002 |
| CN | 207000310 U | * | 2/2018 | ........... B60Q 1/2661 |

OTHER PUBLICATIONS

CA-2369309-C English Translation (Year: 2009).*

(Continued)

*Primary Examiner* — James A Shriver, II
*Assistant Examiner* — Michael T. Walsh

(57) ABSTRACT

A step assembly that includes a side bar configured to be coupled to a vehicle; and a step that includes two step couplers that are spaced apart and configured to attach the step to the side bar, each of the step couplers comprising a ring that encircles the side bar. The step comprises a bridge connecting the two step couplers.

20 Claims, 16 Drawing Sheets

(56) References Cited

U.S. PATENT DOCUMENTS

| | | | |
|---|---|---|---|
| 2019/0047477 A1* | 2/2019 | Crandall | B60Q 1/325 |
| 2019/0126832 A1* | 5/2019 | Knichel | B60R 3/02 |
| 2020/0276936 A1 | 9/2020 | Knichel | |
| 2021/0053496 A1* | 2/2021 | Kaddouh | B60R 3/002 |
| 2021/0261061 A1* | 8/2021 | Fuller | E06C 7/44 |

OTHER PUBLICATIONS

CN-207000310-U English Translation (Year: 2018).*
First Office Action dated Nov. 3, 2023, from Co-Pending Canadian Patent Application No. 3,166,689.

* cited by examiner

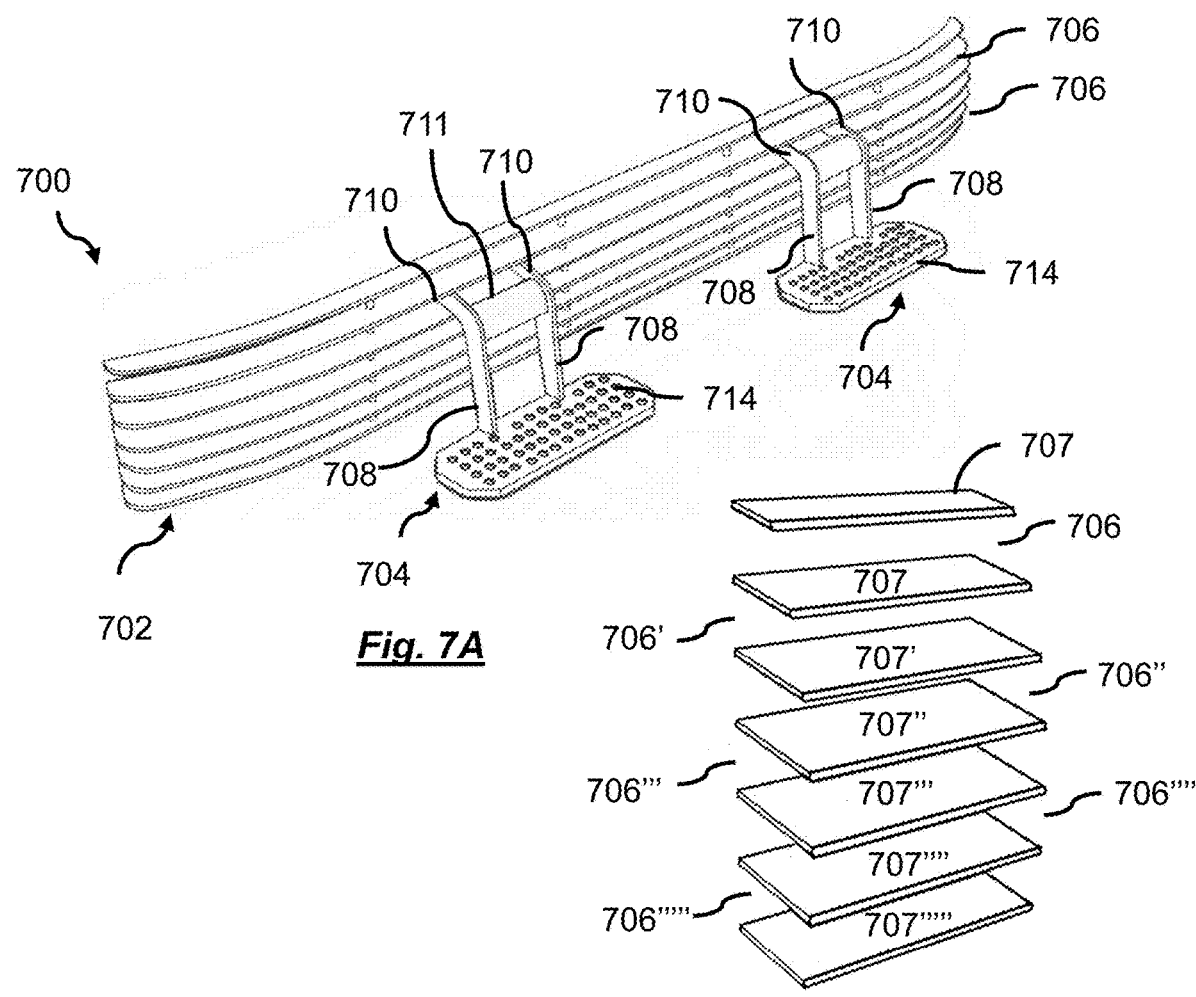
*Fig. 7A*
*Fig. 7B*
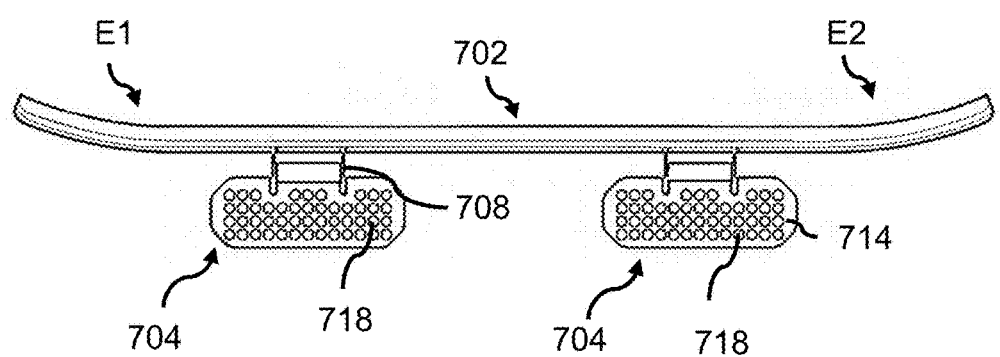
*Fig. 7C*

VEHICLE STEP ASSEMBLY

PRIORITY

This application claims priority to U.S. 63/218,637 filed on Jul. 6, 2021, the entirety of which is hereby incorporated by reference herein for all purposes.

FIELD

These teachings relate to a step assembly for a vehicle.

BACKGROUND

A step assembly may be added to a motor vehicle to assist with ingress and egress to and from the vehicle cabin. Many step assemblies include a side bar attached to the vehicle and a step that is attached to the side bar and positioned below a door of the vehicle. Due to size differences between different vehicle models, a specific step assembly may be required for each vehicle model to ensure one or more steps are aligned and positioned below a vehicle door. It would be desirable to have a step assembly with one or more steps that can be attached to a side bar at one or more locations along a length of the side bar to provide flexibility amongst the various vehicle models for which the step assembly may be used. An example of a step assembly is disclosed in U.S. Pat. No. 10,688,933B2, the entirety of which is incorporated by reference herein for all purposes.

SUMMARY

These teachings provide a step assembly. The step assembly has one or more steps that can be attached to a side bar at various locations along a length thereof to provide flexibility amongst the various vehicle models for which the step assembly may be used.

BRIEF DESCRIPTION OF THE DRAWINGS

FIG. 7A is a perspective view of a step assembly.
FIG. 7B is a partial perspective view of the side bar of the assembly of FIG. 7A.
FIG. 7C is a top view of the step assembly of FIG. 7A.

DETAILED DESCRIPTION

The following description describes a step assembly. It is understood that any of the teachings illustrated and/or described herein may be combined to form a step assembly, whether the feature is illustrated in the same figure or in different figures. For example, teachings from FIG. 5 may be added to or replace teachings in FIG. 6, and so on regarding any of the other figures or description herein. In other words, any combination of features illustrated and/or described herein relating to any feature or assembly of the step assembly may be combined, separated, removed, duplicated, repositioned, reoriented, etc. to form a step assembly, without departing from the spirit of these teachings. It is also understood that while many of the embodiments disclosed herein illustrate one or two steps, the step assembly may include any number of steps, including only one step (i.e., no more than one step) or more than two steps (i.e., at least two steps). Moreover, while the side bar is shown as having a certain number of grooves or channels or structures to define the grooves channels, the side bar may include nay number of such structures, channels, etc.

Figure 1:
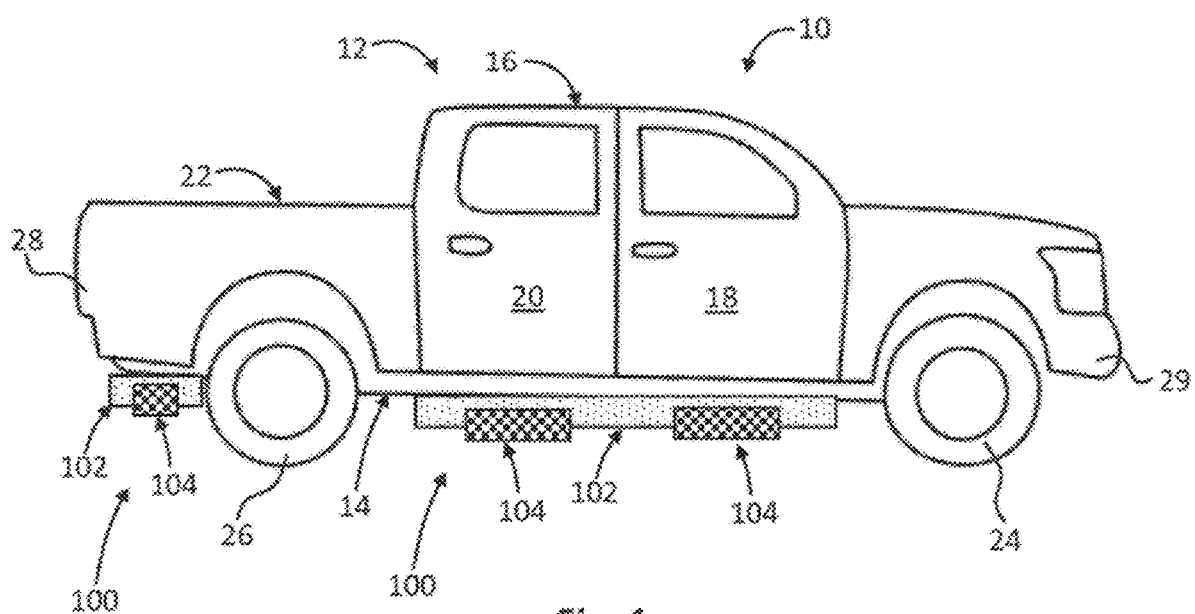
FIG. 1 is a side view of a vehicle and a schematically-illustrated step assembly.

FIG. 1 illustrates a vehicle 10. The vehicle 10 may include a vehicle body 12 supported on a vehicle chassis or frame 14. The vehicle body 12 may include a vehicle cabin 16 having one or more front doors 18 (i.e., front driver side door and passenger side door). The vehicle cabin 16 may optionally have one or more rear doors 20 (i.e., rear driver side door and passenger side doors). The vehicle cabin 16 may have any number of doors for ingress and egress to and from the vehicle cabin 16.

The vehicle body 12 may include a cargo area 22. Depending on the vehicle 10, the cargo area 22 may be a bed, a trunk, or the like. The cargo area 22 may be covered with a tonneau cover, a bed cap, or with other parts of the body 12 (in the case the vehicle is an SUV, sedan, or the like), or the cargo area 22 may remain open without any cover.

One or more step assemblies 100 may be attached to the vehicle 10, vehicle body 12, and/or the vehicle chassis or frame 14. The one or more step assemblies 100 may assist with ingress and egress to and from the vehicle cabin 16, the cargo area 22, or both.

The step assembly 100 may include one or more side bars 102 and one or more steps 104. The one or more side bars 102 may be attached to the vehicle 10, vehicle body 12, and/or vehicle chassis or frame 14 (driver side or passenger side). The one or more side bars 102 may be attached to the vehicle 10 in a location between the front and rear vehicle wheels 24, 26 and generally below the front door 18 and/or the rear door 20. The one or more side bars 102 may be attached to a side of the vehicle 10, vehicle body 12, and/or vehicle frame 14 (driver side or passenger side) in a region rearward of the rear vehicle wheels 26. While not illustrated, the one or more side bars 102 may be attached to a side of the vehicle 10, vehicle body 12, and/or vehicle frame 14 (driver side or passenger side) in a region forward of the front vehicle wheels 24. In such attachment configurations, the side bar 102 may extend generally parallel to a longitudinal axis of the vehicle.

One or more of the side bars 102 may be attached to the driver side of the vehicle. One or more side bars 102 may be attached to the passenger side of the vehicle.

The one or more side bars 102 may be attached to a rear end of the vehicle 10, vehicle body 12, and/or vehicle frame 14, for example in a rearward portion of the vehicle and between the driver and passenger side rear vehicle wheels 26. Such that the step assembly 100 may be arranged generally under or below the vehicle tailgate 28 and/or the rear bumper. The one or more side bars 102 may be attached to the vehicle 10, vehicle body 12, and/or vehicle frame 14 forward of and between the driver and passenger side front vehicle wheels 24 such that the step assembly 100 is arranged generally under or below the vehicle front bumper 29 or vehicle hood. In either of such attachment configurations (front portion of the vehicle and/or rear end of the vehicle), the side bar 102 may extend generally perpendicular to a longitudinal axis of the vehicle. In either of such attachment configurations (front portion of the vehicle and/or rear end of the vehicle), the side bar 102 may extend generally perpendicular to a longitudinal axis of the one or more side bars attached to the sides of the vehicle 10.

The one or more side bars 102 may be attached to the vehicle 10, vehicle body 12, and/or vehicle frame 14 in any suitable manner. For example, the side bar 102 may be fixedly attached to the vehicle 10, vehicle body 12, and/or vehicle frame 14 via one or more fasteners. The one or more fasteners may include one or more brackets, bolts, screws, welds, hangers, and the like. In certain configurations, the one or more side bars 102 may be integrally formed with and/or incorporated into the design of the vehicle 10, vehicle body 12, and/or vehicle chassis or frame 14 such that the side bar and the vehicle 10, vehicle body 12, and/or vehicle frame 14 have a uniform, integrated appearance. In other words, the vehicle chassis, frame 14, bumpers, door panels, rocker panels, etc. may include the one or more side bars 102 and/or the one or more features thereof (i.e., step attachment channels, etc.).

Any of the step assemblies illustrated and/or described herein can be attached, oriented, and/or assembled to a vehicle as discussed and/or illustrated in FIG. 1

Figure 2A:
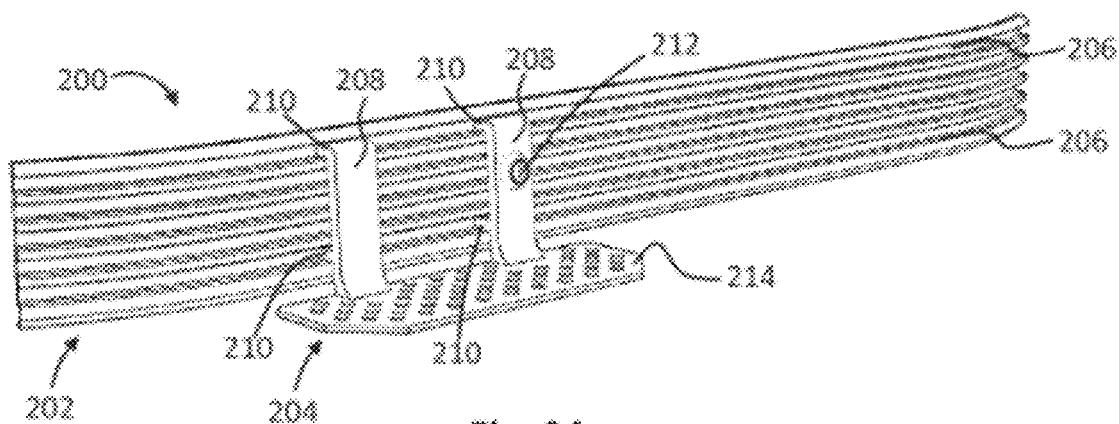
FIG. 2A is a perspective view of a step assembly.
Figure 2B:
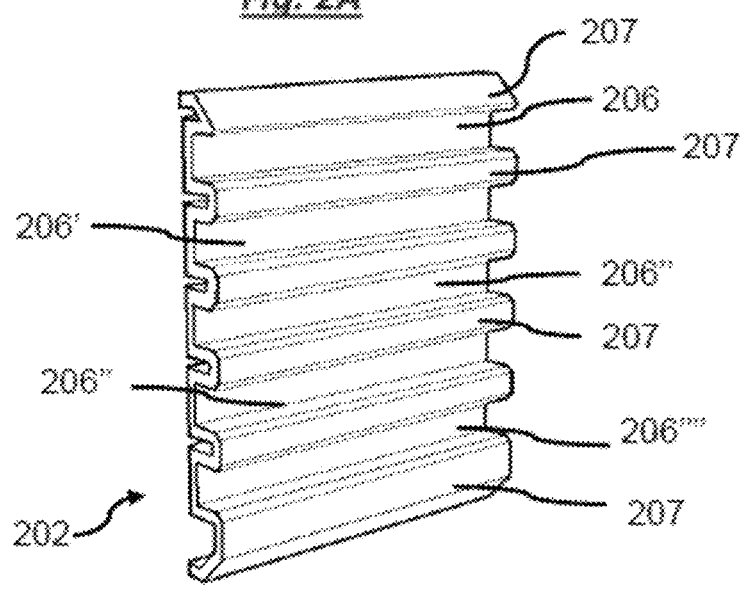
FIG. 2B is a partial perspective view of the side bar of the assembly of FIG. 2A.
Figure 2C:
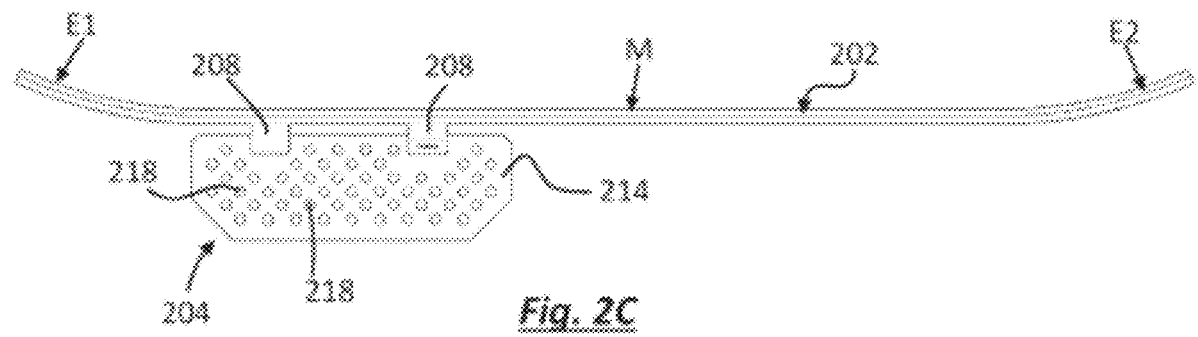
FIG. 2C is a top view of the step assembly of FIG. 2A.

FIGS. 2A, 2B, 2C illustrate a step assembly 200. The step assembly 200 may include any of the features and/or elements described herein that refer specifically to the step assembly 200 and/or to any of the other step assemblies illustrated and/or described herein. The step assembly 200 can be attached to a vehicle to assist with ingress and/or egress. The step assembly 200 comprises one or more side bars 202 and one or more steps 204.

The side bar 202 comprises one or more step attachment channels 206 (5 are illustrated, in FIG. 2B). There can be any number of step attachment channels 206, including one channel 206 (i.e., no more than one step attachment channel). The one or more step attachment channels 206 may extend along an entire length of the side bar 202 between distal most ends E1, E2. In some configurations, the one or more channels 206 may extend or only along a portion of the length of the side bar 202. In some configurations, the one or more channels 206 may extend intermittently along the length of the side bar 202. In other words, the one or more channels 206 may start, stop, start stop, etc. along the length of the side bar 202.

The one or more step attachment channels 206 may extend generally horizontally or generally parallel to a longitudinal axis of the side bar 202. The one or more step attachment channels 206 may have any suitable shape or cross section. For example, the one or more channels 206 may have a cross section that is rectangular, circular, oval, polygonal, non-polygonal, mushroom shaped, T-shaped, etc.

The side bar 206 may have walls, cylinders, or side bar structures 207 that are adjacently arranged to define the attachment channels 206 therebetween. The walls, cylinders, or side bar structures 207 may be square, planar, rectangular, curved, rounded, circular, polygonal, non-polygonal. The walls, cylinders, or side bar structures 207 that define the one or more attachment channels 206 may be angled or drafted, to allow for the one or more steps 204 to couple and engage the channels 206.

Each of the one or more steps 204 may include one or more step couplers 208. A bridge, like the bridge illustrated at FIGS. 4, 5, 7, etc. may extend between the step couplers 208. For example, a step may have only one step coupler 208 or bracket. For example, the step may have two or more step couplers 208. A step coupler 208 may be or may have one or more fingers 210 or brackets. The step coupler 208 or the one or more fingers or brackets 210 may be configured to slide into or be received in the one or more step attachment channels 206 to engage and couple the step 204 to the side bar 202. The one or more fingers or brackets 210 may be configured to slide into or be received between two or more bar structures 207. After the one or more step couplers 208 or fingers 210 are received into the channel 206, the step 204 may be slid within the one or more step attachment channels 206 in an axial or forward and rearward direction of the vehicle 10 (fore, aft) to move or position the one or more steps 204 in any desired position along a length of the side bar 202. This may advantageously allow a single step assembly 200 to be used for vehicles having various body styles, where doors may be located in different positions (i.e., single cab vehicle, vs. crew cab vehicle, vs. double cab vehicles, vs. extended cab vehicles, etc.).

The step coupler 208 or the one or more fingers or brackets 210 may engage various step attachment channels 206 to adjust a height of the one or more steps 204 relative to the ground and/or the vehicle body 12. For example, by engaging lower step attachment channels (i.e., channels 206'''', 206''', 206''), the one or more steps 204 may be positioned vertically lower or closer to the ground compared to if the step coupler 208 or the one or more fingers 210 engage the higher step attachment channel (i.e., channels 206, 206', 206'', etc.). This may advantageously allow a single step assembly 200 to be used for vehicles having various body heights (i.e., when a vehicle has larger or smaller tires, is raised, or has a lift kit, is lowered, or located closer to the ground, etc.).

The two or more fingers or brackets 210 may engage two or more corresponding channels 206. This may help secure the step to the side bar. The one or more fingers or brackets 210 may have an undercut or downwardly projecting part that helps secure the finger or bracket 210 to the channel 206. In some configurations, the fingers or brackets 210 may be flexible or resilient, which may allow the fingers or brackets 210 to apply a force or compressing force onto the channels 206 or bar structure 207 for the coupler 208 or bracket 210 to grasp onto the side bar, channel 206, and/or bar structure 207. In some configurations, the two or more fingers or brackets 210 can be moved, for example, with a key or wrench to reduce the gap or distance between the two fingers or brackets 210, which may thus apply the force or compression force onto the channels 206 or bar structure.

The one or more steps 204 may have one or more securing mechanisms 212. The one or more securing mechanisms 212 may function to lock or secure the one or more steps 204 to the side bar 202. The one or more securing mechanisms 212 may function to restrict or prevent movement or removal of the one or more steps 204 from the side bar 202. The securing mechanism 212 may be provided anywhere on the step 204, the one or more step couplers 208, fingers 210, etc. The one or more securing mechanisms 212 may temporarily or removably secure the step to the side bar 202 such that position of the steps 204 on the side bar 202 can be changed. The one or more securing mechanisms 212 may be tightened to prevent movement of the steps 204 relative to the channels 206. The one or more securing mechanisms 212 may be loosened to allow movement of the steps 204 relative to the channels 206. The one or more securing mechanisms 212 may be tightened with a key or wrench or other tool. The one or more securing mechanisms 212 may be a lock. The one or more securing mechanisms 212 may latch onto the one or more channels or bars 206, 207. The one or more securing mechanisms 212 may cause the one or more fingers 210 to pinch or capture the one or more channels or bars 206, 207. The one or more securing mechanisms may be located only one of the of the couplers 208 or on two or more of the couplers 208. The one or more securing mechanisms may be located on an A-side (facing outwardly) of the coupler 208 or on a B-side of the coupler 208 (facing inwardly). The one or more securing mechanisms may be covered or protected by a cover or patch to hide and/or protect the securing mechanism. The one or more securing mechanisms may be one or more pins, screws, bolts, or other fastener that extends through the coupler and engages a hole in the side bar or the side bar. For example, the one or more securing mechanism may be a set screw, or a bolt that engages a threaded hole in the side bar.

The one or more steps 204 may have one or more platforms 214. The one or more platforms 214 may be secured to the one or more step couplers 208 and may extend horizontally or laterally away from the side bar 202 and/or step couplers 208 and/or the vehicle after the steps 204 are connected to the side bar 202 and the side bar 202 is connected to the vehicle 10. The platform 216 may have a top surface with one or more features 218 providing traction or anti-slip for a user stepping on the platform 216. The one or more features 218 may be raised protrusions or projections, depressions, cutouts, ribs, channels, bumps, grips, slots, channels, points, and the like.

The side bar 202 may have a length that extends between ends E1 and E2. The length may be substantially straight or the ends E1 and/or E2 may be curved inwardly relative to the middle M of the side bar 102. The ends E1 and/or E2 may follow a side profile of the vehicle, between the front and rear vehicle wheels 24, 26. The inwardly curved end E1 and/or E2 may be tucked behind the front wheel and/or Infront of the rear wheel.

Figure 3A:
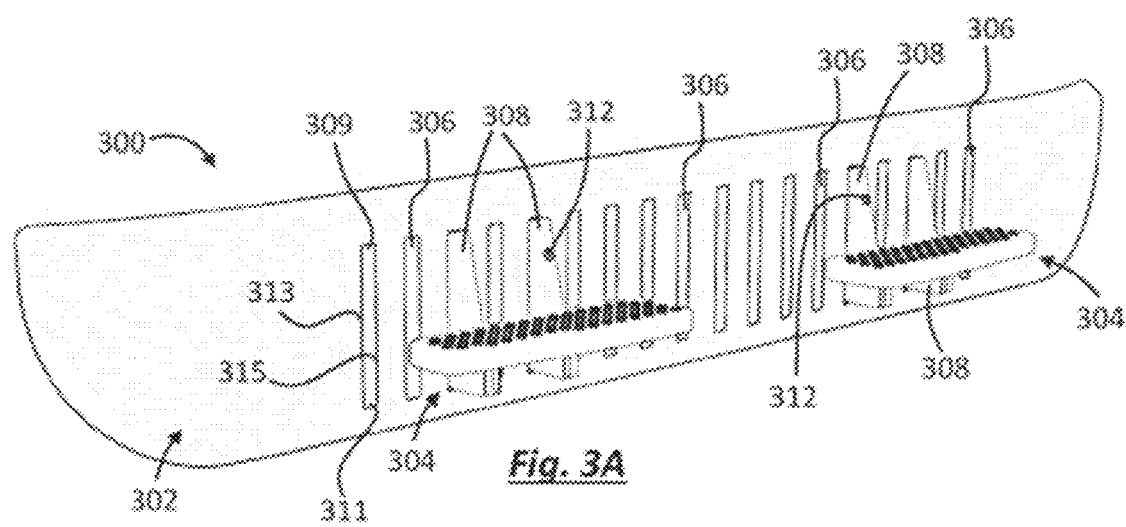
FIG. 3A is a perspective view of a step assembly.
Figure 3B:
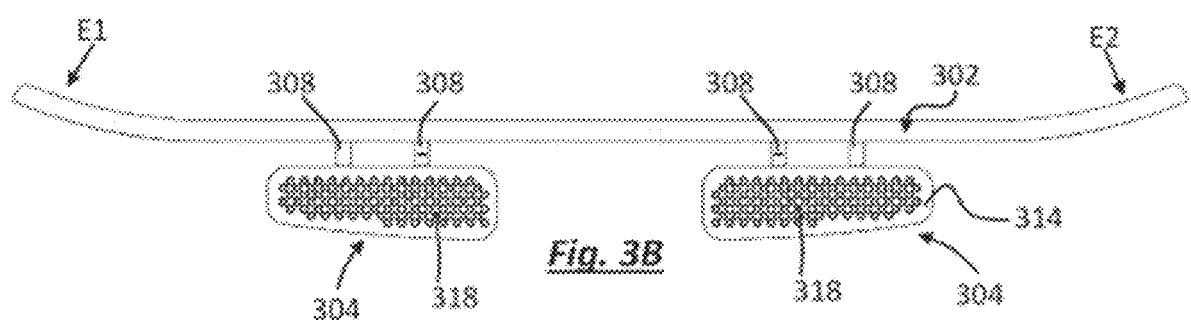
FIG. 3B is a top view of the step assembly of FIG. 3A.

FIGS. 3A and 3B illustrate a step assembly 300. The step assembly 300 may include any of the features and/or elements described herein that refer specifically to the step assembly 300 and/or to any of the other step assemblies illustrated and/or described herein. The step assembly 300 can be attached to a vehicle to assist with ingress and/or egress. The step assembly 300 comprises a side bar 302 and one or more steps 304.

The side bar 302 comprises one or more step attachment channels 306. The one or more step attachment channels 306 may extend along an entire length of the side bar 302, or only along a portion of the length of the side bar 302 between ends E1, E2 as illustrated in FIG. 3A. The one or more step attachment channels 306 may extend generally vertically or generally perpendicular to a longitudinal axis of the side bar 302. In some configurations, the one or more channels 306 may extend at an angle (acute or obtuse) relative to the longitudinal axis of side bar 302.

The one or more step attachment channels 306 may have any suitable shape or cross section, such as rectangular, circular, oval, polygonal, non-polygonal, mushroom shaped, T-shaped, V-shaped, etc. The walls that define the one or more attachment channels 306 may be generally planar or rounded. The walls that define the one or more attachment channels 306 may be angled or drafted, to allow for the one or more steps 304 to couple and engage the channels 306.

Each of the one or more steps 304 may include one or more step couplers 308. A bridge, like the bridge illustrated at FIGS. 4, 5, 7, etc. may extend between the step couplers 308. The step coupler 308 or the one or more fingers of the step coupler 308 may be configured to slide into or be received in the one or more step attachment channels 306 to engage and couple the step 304 to the side bar 302. The one or more step couplers 308 or fingers may be slid within any of the one or more step attachment channels 306 in an axial or forward and rearward direction of the vehicle (fore, aft) to move or position the one or more steps 304 in any desired position along a length of the side bar 302. This may advantageously allow a single step assembly 300 to be used for vehicles having various body styles, where doors may be located in different positions (i.e., single cab vehicle, vs. crew cab vehicle, vs. double cab vehicles, vs. extended cab vehicles, etc.).

The one or more step couplers 308 or fingers may be attached by first engaging an upper end 309 of the channel 306 and then rocking or pivoting the step coupler 308 or finger into the lower end 311 of the channel 306. Additionally, or alternatively, the one or more step couplers 308 or fingers may be attached by first engaging an edge 313 of the channel 306 and then rocking or pivoting the step coupler 308 or finger into the other edge 315 of the channel 306.

The one or more step couplers 308 or fingers may have one or more feet or flanges that are configured to engage the channel 306 and to prevent or restrict a straight removal or separation of the coupler 308 from the channel.

The one or more step couplers 308 or fingers may have a size that is slightly wider and/or taller than the channel 306, which may allow the fit between the coupler and channel to be a press or friction fit. In some configurations, the one or more step couplers 308 or fingers may be made from a compressible or resilient material, which may allow for a wider or larger step coupler or finger to engage the channel 306 and then be retained therein.

The side bar 302 may also have additional channels 306 to allow for various vertical step installations to accommodate vehicles having larger or smaller ground clearances.

The one or more steps 304 may have one or more securing mechanisms 312 for securing the one or more steps 304 to the side bar 302. The securing mechanism 312 may be or may include any of the securing mechanisms disclosed herein. The one or more securing mechanisms 312 may function to restrict or prevent movement or removal of the one or more steps 304 from the side bar 302 or attachment channels 306. The securing mechanism 312 may be provided anywhere on the step 304, the one or more step couplers 308, fingers, etc. The one or more securing mechanisms 312 may be tightened to prevent movement of the steps 304 relative to the channels 306. The one or more securing mechanisms 312 may be loosened to allow movement of the steps 304 relative to the channels 306.

The one or more steps 304 may have one or more platforms 314. The one or more platforms 314 may be secured to the one or more step couplers 308 and may extend laterally away from the side bar 302 and/or step couplers 308. The platform 314 may have a top surface with one or more features 318 providing traction or anti-slip for a user when stepping on the platform 314. The one or more features 318 may be raised protrusions or projections, depressions, cutouts, ribs, channels, bumps, and the like.

Figure 4A:
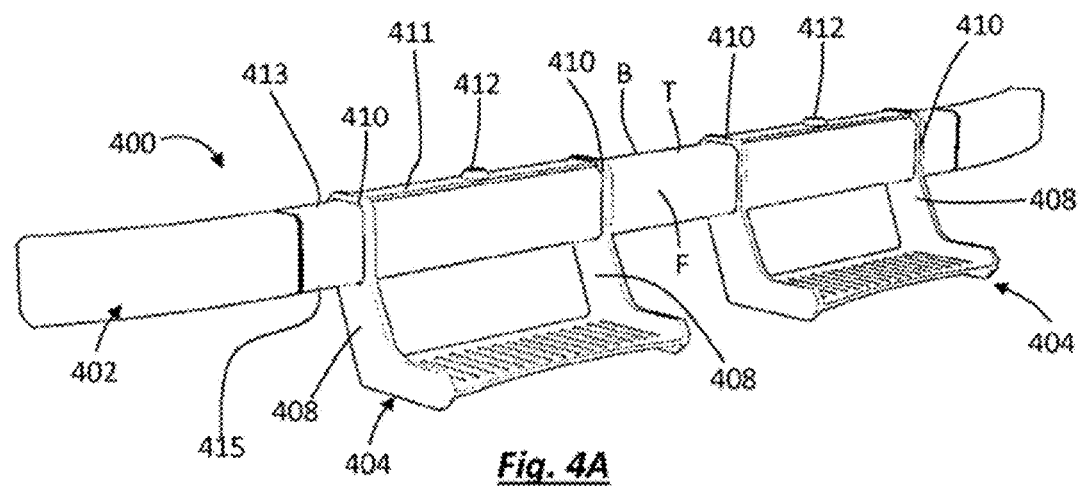
FIG. 4A is a perspective view of a step assembly.
Figure 4B:
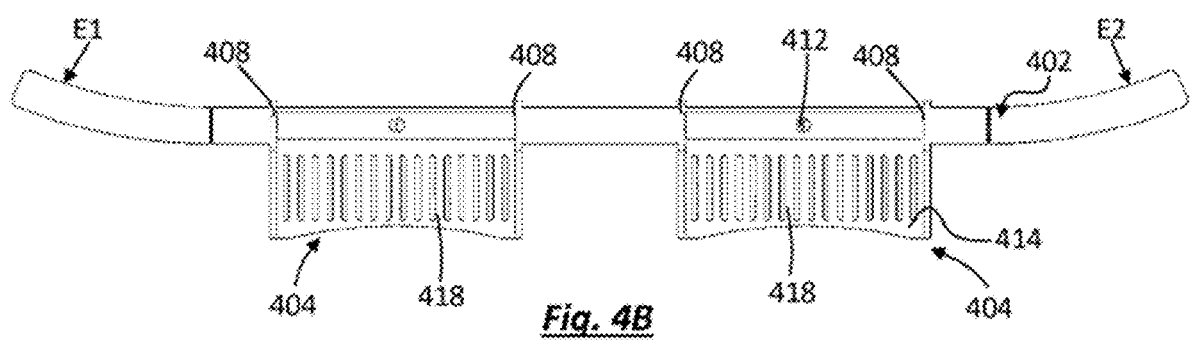
FIG. 4B is a top view of the step assembly of FIG. 4A.

FIGS. 4A and 4B illustrate a step assembly 400. The step assembly 400 may include any of the features and/or elements described herein that refer specifically to the step assembly 400 and/or to any of the other step assemblies illustrated and/or described herein. The step assembly 400 can be attached to a vehicle to assist with ingress and/or egress. The step assembly 400 comprises a side bar 402 and one or more steps 404.

Each of the one or more steps 404 may include one or more step couplers 408. A step coupler 408 may have one or more fingers 410. The step coupler 408 or the one or more fingers 410 may be configured to engage the side bar 402. More specifically, the one or more fingers 410 may slide over, or at least partially surround an outer perimeter of the side bar 402. In other words, the one or more fingers 410 may be one or more hooks, fingers, rings, or latches that hook over a front surface, a top surface T, and/or a back surface B of the side bar 402. Alternatively, the one or more fingers 410 may completely surround an outer perimeter of the side bar 402 (i.e., the one or more fingers 410 may be one or more rings through which the side bar 402 extends).

Figure 4C:
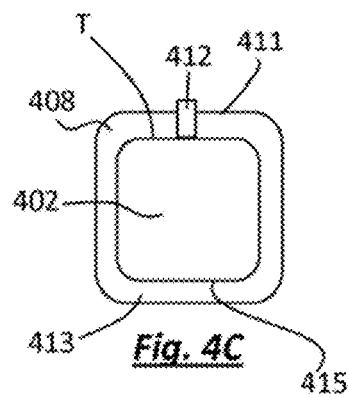
FIG. 4C is a cross section of the step assembly of FIG. 4A.
Figure 4D:
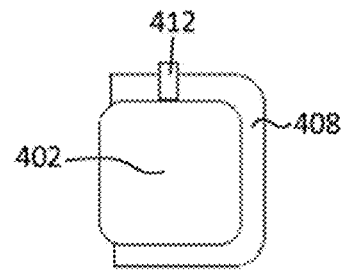
FIG. 4D is a cross section of the step assembly of FIG. 4A.
Figure 4E:
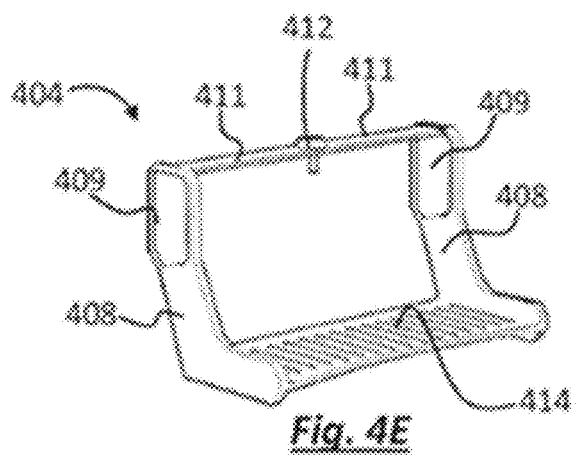
FIG. 4E is a perspective view of a step.

For example, referring to FIG. 4C, the finger 410 may be a ring that completely surrounds the side bar 402. For example, referring to FIG. 4D, the finger 410 have a C-shaped cross section that only partially surrounds the side bar 402.

The one or more step couplers 408 or fingers 410 may be moved or slid along a length of the side bar 402 in an axial or forward and rearward direction of the vehicle (fore, aft) to move or position the one or more steps 404 in any desired position along a length of the side bar 402 between ends E1 and E2. This may advantageously allow a single step assembly 400 to be used for vehicles having various body styles, where doors may be located in different positions (i.e., single cab vehicle, vs. crew cab vehicle, vs. double cab vehicles, vs. extended cab vehicles, etc.).

The one or more steps 404 may have one or more securing mechanisms 412 for securing the one or more steps 404 to the side bar 402. The one or more securing mechanisms 412 may function to restrict or prevent movement or removal of the one or more steps 404 from the side bar 402. The securing mechanism 412 may be provided anywhere on the step 404, the one or more step couplers 408, fingers 410, etc. The one or more securing mechanisms 412 may be tightened to prevent movement of the steps 404 relative to the side bar 402. The one or more securing mechanisms 412 may be loosened to allow movement of the steps 404 relative to the side bar 402. The securing mechanism 412 may be a lock, screw, bolt, set screw, the like or a combination thereof. the securing mechanism 412 may be or may include any of the securing mechanisms disclosed herein.

The one or more steps 404 may have one or more platforms 414. The one or more platforms 414 may be secured to the one or more step couplers 408 and may extend laterally away from the side bar 402 and/or step couplers 408. The platform 414 may have a top surface with one or more features 418 providing traction or anti-slip to provide tracking for a user when stepping on the platform 414. The one or more features 418 may be raised protrusions or projections, depressions, cutouts, ribs, channels, bumps, and the like.

FIGS. 4E, 4F, 4G, 4H, 4I each illustrate a step 404. The step 404 in FIG. 4E has two step couplers 408 that are spaced apart from each other. Each of the step couplers 408 comprises a ring 409 that encircles the side bar 402 (See FIGS. 4A and 4C). The step 404 has a bridge 411 that extends between and connects the two step couplers 408. The bridge 411 may also be referred to as an upper bridge 411.

The bridge 411 may extend along and/or generally parallel to the side bar 402. The bridge 411 may be in contact with one or more surfaces of the side bar 402, such as the top surface T of the side bar 402 (See FIGS. 4A and 4C). Alternatively, the bridge 411 may be spaced apart from one or more surfaces of the side bar 402, such as the top surface T of the side bar 402 (See FIGS. 4A and 4C).

The step may include a platform 414 having a substantially planar surface, and the bridge 411 comprises a substantially planar surface that is generally parallel to the substantially planar surface of the platform 414.

Figure 4F:
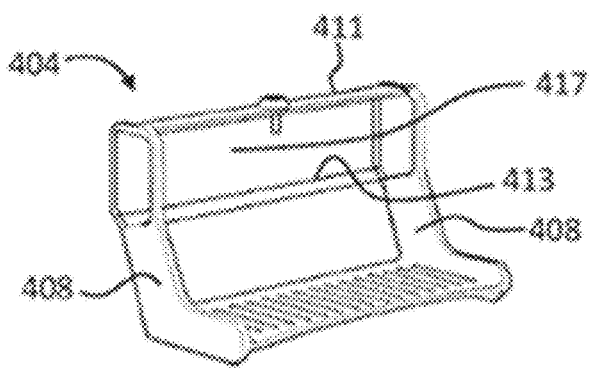
FIG. 4F is a perspective view of a step.

Referring now to FIG. 4F, the step 404 may include an upper bridge 411 and a lower bridge 413. The lower bridge 413 may also extend between and connect the two step couplers 408. The lower bridge 413 may extend along a bottom surface 415 of the side bar 404, the bottom surface 415 of the side bar 404 opposes the top surface T of the side bar 404 (See FIGS. 4A and 4C).

The step 404 may include an open space 417 between the upper bridge 411 and the lower bridge 413 and between the two step couplers 408 such that the side bar 404 is visible through the open space 417.

Figure 4G:
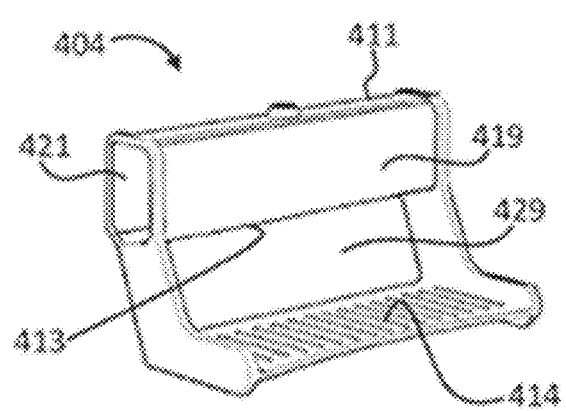
FIG. 4G is a perspective view of a step.

Alternatively, as illustrated in FIG. 4G, the step 404 or bridge may include front and back bridge surfaces 419, 421, respectively. The bridge surfaces 411, 413, 419, and 421 may cooperate to form a housing 423. The bridge surfaces 411, 413, 419, 421 and/or housing 423 may substantially enclose or encircle the side bar 402 between the two step couplers 408 such that the side bar 402 not visible between the two step couplers 408. The step 404 may include an open space 429 between the bridge or the bottom bridge 413 and the platform 414. Alternatively, the open space region 429 may be eliminated and include a continuous structure, like shown in the step 500 of FIG. 5A-5C.

One or more of the bridge surfaces 411, 413, 419, 421 may include a securing mechanism 412. The securing mechanism 412 may be any securing mechanism disclosed herein. The securing mechanism 142 may secure or attach bridge to the side bar. Referring to FIG. 4I, the securing mechanism 412 may include a handle 425 that is configured to be pivoted away from the step 404 or bridge surface about a pin or hinge 427 to lock or unlock the securing mechanism 412. Movement of the handle about the pin or hinge may cause a member such as a pin or spring to apply a force onto the side bar to secure the step from relative movement.

Figure 4H:
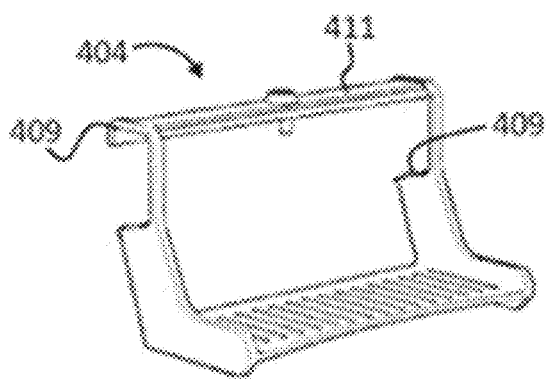
FIG. 4H is a perspective view of a step.
Figure 4I:
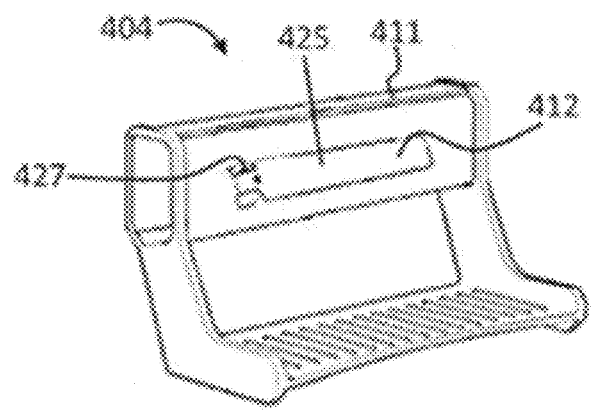
FIG. 4I is a perspective view of a step.

In FIG. 4H, the ring 409' has a C- or U-shape, and therefore only partially encircles the side bar 402.

Figure 5A:
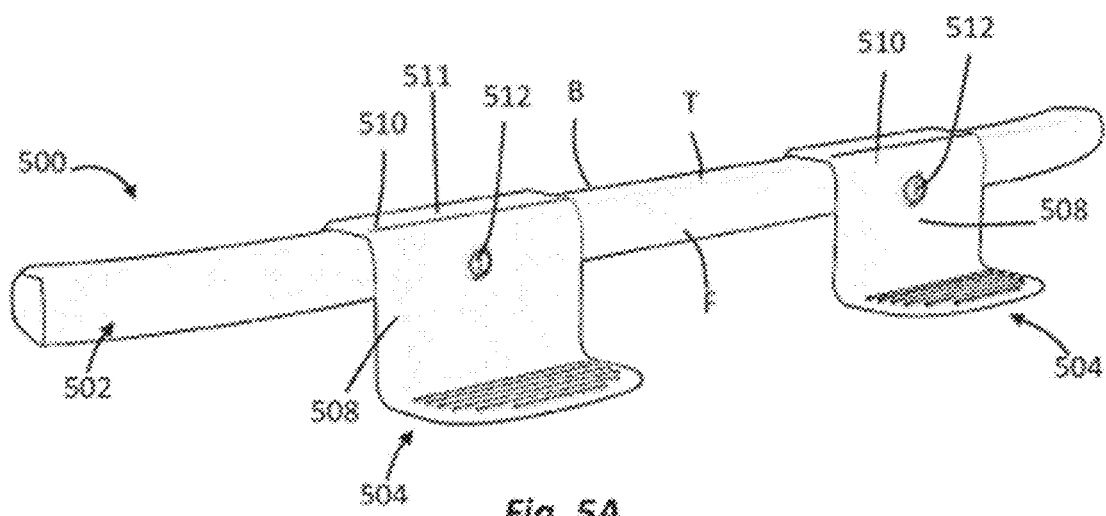
FIG. 5A is a perspective view of a step assembly.
Figure 5B:
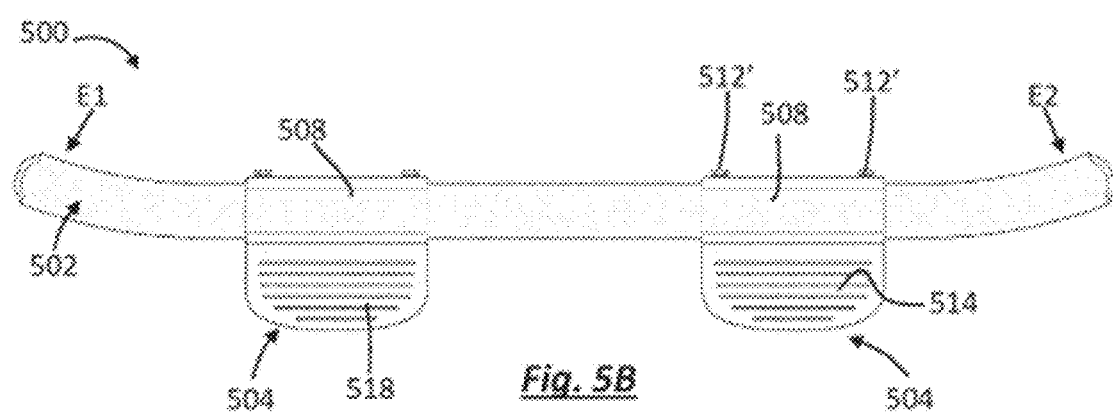
FIG. 5B is a top view of the step assembly of FIG. 5A.
Figure 5C:
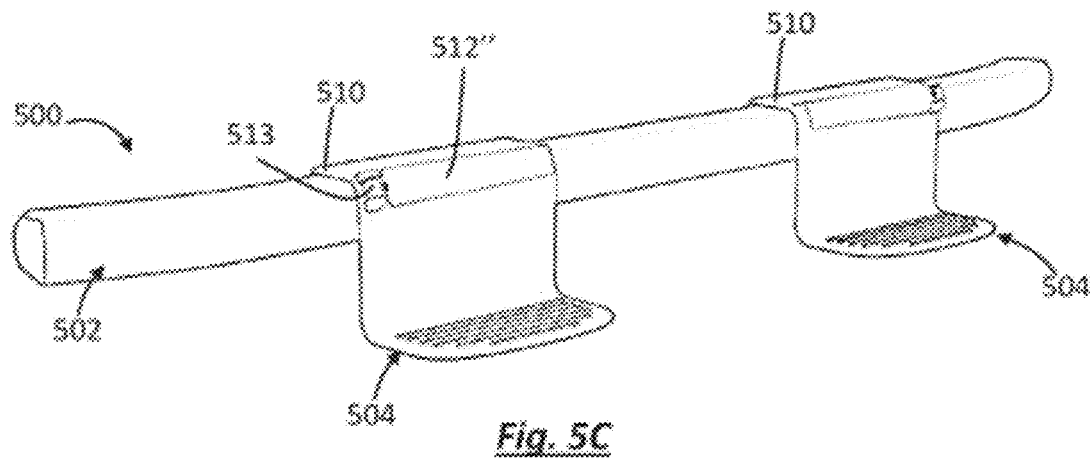
FIG. 5C is a perspective view of a step assembly.

FIGS. 5A, 5B, and 5C illustrate a step assembly 500. The step assembly 500 may include any of the features and/or elements described herein that refer specifically to the step assembly 500 and/or to any of the other step assemblies illustrated and/or described herein. The step assembly 500 can be attached to a vehicle to assist with ingress and/or egress. The step assembly 500 comprises a side bar 502 and one or more steps 504.

Each of the one or more steps 504 may include one or more step couplers 508. A bridge 511 may extend between the two opposing step couplers 508. Any description herein related to the bridge may apply to this step 500. The step coupler 508 may have one or more fingers 510. The step coupler 508 or the one or more fingers 510 may be configured to engage the side bar 502. More specifically, the one or more fingers 510 may slide over, or at least partially surround an outer perimeter of the side bar 502. In other words, the one or more fingers 510 may be one or more hooks, fingers, or latches that hook over a front surface, a top surface T, and/or a back surface B of the side bar 502. Alternatively, the one or more fingers 510 may completely surround an outer perimeter of the side bar 502 (i.e., the one or more fingers 510 may be one or more rings through which the side bar 502 extends, similar to the cross section in FIG. 4C).

The one or more step couplers 508 or fingers 510 may be move or slid along a length of the side bar 502 in an axial or forward and rearward direction of the vehicle (fore, aft) to move or position the one or more steps 504 in any desired position along a length of the side bar 502 between ends E1 and E2. This may advantageously allow a single step assembly 500 to be used for vehicles having various body styles, where doors may be located in different positions (i.e., single cab vehicle, vs. crew cab vehicle, vs. double cab vehicles, vs. extended cab vehicles, etc.).

The one or more steps 504 may have one or more securing mechanisms 512, 512' and/or 512" for securing the one or more steps 504 to the side bar 502. The one or more securing mechanisms 512, 512' and/or 512" may function to restrict or prevent movement, removal, or separation of the one or more steps 504 from the side bar 502. The securing mechanism 512, 512' and/or 512" may be provided anywhere on the step 504, the one or more step couplers 508, fingers 510, etc. In FIG. 5A, the securing mechanism 512 is located on a front surface of the step 504. In FIG. 5B, the securing mechanism 512' is located on a back or rear surface of the step 504. In FIG. 5C, the securing mechanism 512" is located on a front surface of the step 504. The securing mechanism 512" comprises a handle that can be pivoted away from the step 504 about a pin or hinge 513 to lock or unlock the securing mechanism 512". The one or more securing mechanisms 512 may be tightened to prevent movement of the steps 504 relative to the side bar 502. The one or more securing mechanisms 512 may be loosened to allow movement of the steps 504 relative to the side bar 502.

The one or more steps 504 may have one or more platforms 514. The one or more platforms 514 may be secured to the one or more step couplers 508 and may extend laterally away from the side bar 502 and/or step couplers 508. The platform 514 may have a top surface with one or more features 518 providing traction or anti-slip to provide tracking for a user when stepping on the platform 514. The one or more features 518 may be raised protrusions or projections, depressions, cutouts, ribs, channels, bumps, and the like.

Figure 6A:
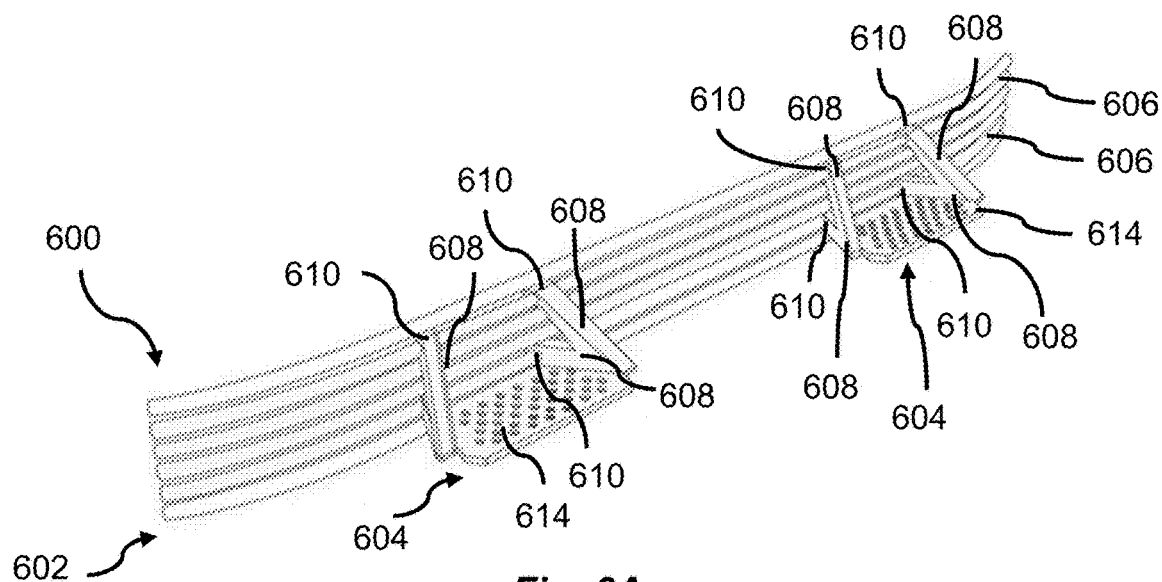
FIG. 6A is a perspective view of a step assembly.
Figure 6B:
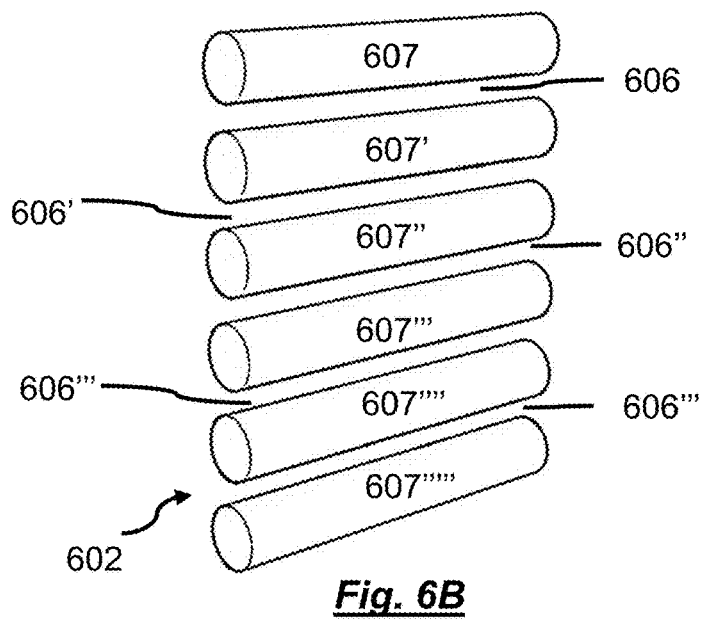
FIG. 6B is a partial perspective view of the side bar of the assembly of FIG. 6A.
Figure 6C:
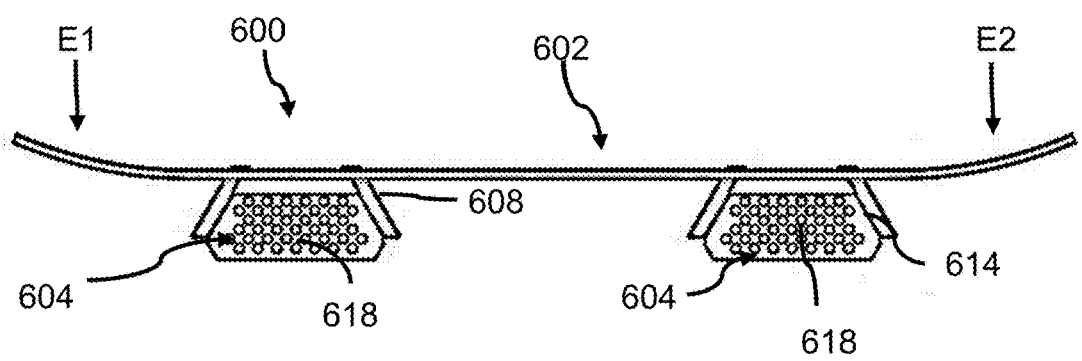
FIG. 6C is a top view of the step assembly of FIG. 6A.

FIGS. 6A, 6B, and 6C illustrate a step assembly 600. The step assembly 600 may include any of the features and/or elements described herein that refer specifically to the step assembly 600 and/or to any of the other step assemblies illustrated and/or described herein. The step assembly 600 can be attached to a vehicle to assist with ingress and/or egress.

The step assembly 600 comprises a side bar 602 and one or more steps 604. The side bar 602 comprises one or more step attachment channels 606 (5 are illustrated, in FIG. 6B). The one or more step attachment channels 606 may extend along an entire length of the side bar 202, or only along a portion of the length of the side bar 602 between ends E1, E2. The one or more step attachment channels 606 may extend generally horizontally or generally parallel to a longitudinal axis of the side bar 602. The one or more step attachment channels 606 may have any suitable shape or cross section, such as rectangular, circular, oval, polygonal, non-polygonal, mushroom shaped, T-shaped, etc. The walls that define the one or more attachment channels 606 may be generally planar or rounded, as shown in FIG. 6B. The walls that define the one or more attachment channels 606 may be angled or drafted, to allow for the one or more steps 604 to couple and engage the channels 606.

Each of the one or more steps 604 may include one or more step couplers 608. In this embodiment, each step 604 comprises a total of four (4) step couplers 608—two couplers 608 on each side of the step platform 614. Each step coupler 608 may have one or more fingers 610. The step coupler 608 or the one or more fingers 610 may be configured to slide into or be received in the one or more step attachment channels 606 to engage and couple the step 604 to the side bar 602. The one or more step couplers 608 or fingers 610 may be slid within the one or more step attachment channels 606 in an axial or forward and rearward direction of the vehicle (fore, aft) to move or position the one or more steps 604 in any desired position along a length of the side bar 602. This may advantageously allow a single step assembly 600 to be used for vehicles having various body styles, where doors may be located in different positions (i.e., single cab vehicle, vs. crew cab vehicle, vs. double cab vehicles, vs. extended cab vehicles, etc.). The finger 610 in this embodiment may resemble a claw or hook or cuff, that at least partially surrounds one of the walls, cylinders, or s side bar structures defining the attachment channels 606 therebetween and extend into the adjacent channels 606. More specifically, in FIG. 6B, the side bar 602 comprises six (6) walls, cylinders, or side bar structures 607 and the channels 606 are defined between adjacent or juxtaposed walls, cylinders, or side bar structures 607. The walls, cylinders, or side bar structures 607 may have virtually any cross-sectional shape (square, polygonal, non-polygonal, circular, rounded, angled, etc.) and the spacing therebetween may be virtually any size.

The step coupler 608 or the one or more fingers 610 may also engage various step attachment channels 606 to adjust a height of the one or more steps 604 relative to the ground and/or the vehicle body 12. For example, by engaging the lower step attachment channels (i.e., channels 606'''', 606''', 606″), the one or more steps 604 may be positioned vertically lower or closer to the ground compared to if the step coupler 608 or the one or more fingers 610 engage the higher step attachment channels (i.e., channels 606, 606′, 606″, etc.). This may advantageously allow a single step assembly 600 to be used for vehicles having various body heights (i.e., when a vehicle has larger or smaller tires, is raised, or has a lift kit, etc.).

The one or more steps 604 may have one or more platforms 614. The one or more platforms 614 may be secured to the one or more step couplers 608 and may extend laterally away from the side bar 602 and/or step couplers 608. The platform 614 may have a top surface with one or more features 618 providing traction or anti-slip to provide tracking for a user when stepping on the platform 614. The one or more features 618 may be raised protrusions or projections, depressions, cutouts, ribs, channels, bumps, and the like.

The side bar 602 may have a length that extends between ends E1 and E2. The length may be substantially straight or the ends E1 and/or E2 may be curved relative to the middle M of the side bar 102. The ends E1 and/or E2 may follow a side profile of the vehicle, between the front and rear vehicle wheels 24, 26.

FIGS. 7A, 7B, and 7C illustrate a step assembly 700. The step assembly 700 comprises a side bar 702 and one or more steps 704. The side bar 702 comprises one or more step attachment channels 706 (6 are illustrated, in FIG. 7B). The one or more step attachment channels 706 may extend along an entire length of the side bar 702, or only along a portion of the length of the side bar 702 between ends E1, E2. The one or more step attachment channels 706 may extend generally horizontally or generally parallel to a longitudinal axis of the side bar 702. The one or more step attachment channels 706 may have any suitable shape or cross section, such as rectangular, circular, oval, polygonal, non-polygonal, mushroom shaped, T-shaped, etc. The walls that define the one or more attachment channels 706 may be generally rounded or planar, as shown in FIG. 7B. The walls that define the one or more attachment channels 706 may be angled or drafted, to allow for the one or more steps 704 to couple and engage the channels 706.

Each of the one or more steps 704 may include one or more step couplers 708. In this embodiment, each step 704 comprises two (2) step couplers 708—one coupler 708 on each side of the step platform 714. A bridge 711 may extend between the two opposing step couplers 708. Any description herein related to the bridge may apply to this step 700. Each step coupler 708 may have one or more fingers 710. The step coupler 708 or the one or more fingers 710 may be configured to slide into or be received in the one or more step attachment channels 706 to engage and couple the step 704 to the side bar 702. The one or more step couplers 708 or fingers 710 may be slid within the one or more step attachment channels 706 in an axial or forward and rearward direction of the vehicle (fore, aft) to move or position the one or more steps 704 in any desired position along a length of the side bar 702. This may advantageously allow a single step assembly 700 to be used for vehicles having various body styles, where doors may be located in different positions (i.e., single cab vehicle, vs. crew cab vehicle, vs. double cab vehicles, vs. extended cab vehicles, etc.). The finger 710 in this embodiment may resemble a claw or hook or cuff, that at least partially surrounds one of the walls, cylinders, or side bar structures defining the attachment channels 706 therebetween and extend into the adjacent channels 706. More specifically, in FIG. 7B, the side bar 702 comprises seven (7) walls, cylinders, or side bar structures 707 and the channels 706 are defined between adjacent or juxtaposed walls, cylinders, or side bar structures 707. The walls, cylinders, or structures 707 may have virtually any cross-sectional shape (square, polygonal, non-polygonal, circular, rounded, angled, etc.) and the spacing therebetween may be virtually any size.

The step coupler 708 or the one or more fingers 710 may also engage various step attachment channels 706 to adjust a height of the one or more steps 704 relative to the ground and/or the vehicle body 12. For example, by engaging the lower step attachment channels (i.e., channels 706″″, 706″″, 706‴), the one or more steps 704 may be positioned vertically lower or closer to the ground compared to if the step coupler 708 or the one or more fingers 710 engage the higher step attachment channels (i.e., channels 706, 706′, 706″, etc.). This may advantageously allow a single step assembly 700 to be used for vehicles having various body heights (i.e., when a vehicle has larger or smaller tires, is raised, or has a lift kit, etc.).

The one or more steps 704 may have one or more platforms 714. The one or more platforms 714 may be secured to the one or more step couplers 708 and may extend laterally away from the side bar 702 and/or step couplers 708. The platform 716 may have a top surface with one or more features 718 providing traction or anti-slip to provide tracking for a user when stepping on the platform 716. The one or more features 718 may be raised protrusions or projections, depressions, cutouts, ribs, channels, bumps, and the like.

The side bar 702 may have a length that extends between ends E1 and E2. The length may be substantially straight or the ends E1 and/or E2 may be curved relative to the middle M of the side bar 102. The ends E1 and/or E2 may follow a side profile of the vehicle, between the front and rear vehicle wheels 24, 26.

Figure 8A:
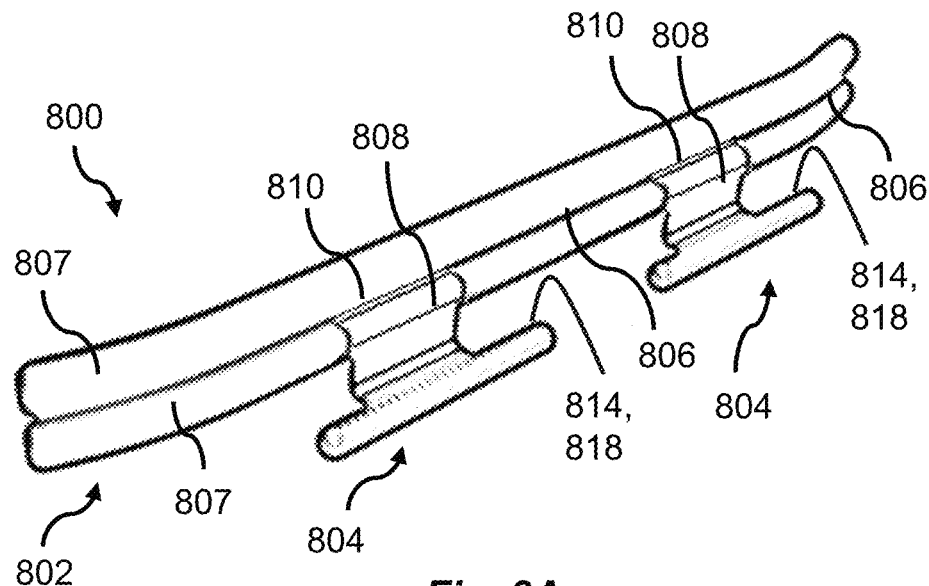
FIG. 8A is a perspective view of a step assembly.
Figure 8B:
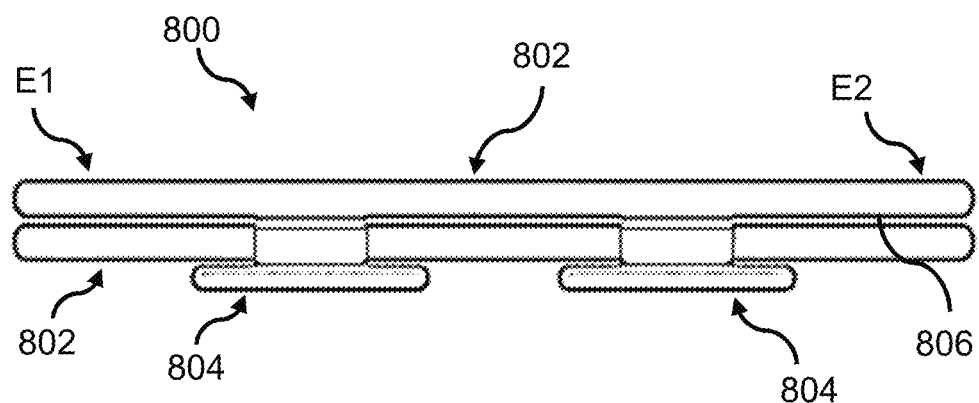
FIG. 8B is a front view of the assembly of FIG. 8A.

FIGS. 8A and 8B illustrate a step assembly 800. The step assembly 800 comprises a side bar 802 and one or more steps 804. The side bar 802 comprises one or more step attachment channels 806 (1 is illustrated). The one or more step attachment channels 806 may extend along an entire length of the side bar 802, or only along a portion of the length of the side bar 802 between ends E1, E2. The one or more step attachment channels 806 may extend generally horizontally or generally parallel to a longitudinal axis of the side bar 802. The one or more step attachment channels 806 may have any suitable shape or cross section, such as rectangular, circular, oval, polygonal, non-polygonal, mushroom shaped, T-shaped, etc. The walls that define the one or more attachment channels 806 may be generally planar or rounded. The walls that define the one or more attachment channels 806 may be angled or drafted, to allow for the one or more steps 804 to couple and engage the channels 806.

Each of the one or more steps 804 may include one or more step couplers 808. Each step coupler 808 may have one or more fingers 810. The step coupler 808 or the one or more fingers 810 may be configured to slide into or be received in the one or more step attachment channels 806 to engage and couple the step 804 to the side bar 802. The one or more step couplers 808 or fingers 810 may be slid within the one or more step attachment channels 806 in a lateral or forward and rearward direction of the vehicle (fore, aft) to move or position the one or more steps 804 in any desired position along a length of the side bar 802. This may advantageously allow a single step assembly 800 to be used for vehicles having various body styles, where doors may be located in different positions (i.e., single cab vehicle, vs. crew cab vehicle, vs. double cab vehicles, vs. extended cab vehicles, etc.). The finger 810 in this embodiment may resemble a finger, flange, hook, prong that engages the channel and at least partially surrounds one of the walls, cylinders, or structures defining the attachment channels 806 therebetween and extend into the adjacent channels 806. More specifically, the side bar 802 comprises two (2) walls, cylinders, or structures 807 and the channels 806 are defined between adjacent or juxtaposed walls, cylinders, or structures 807. The walls, cylinders, or structures 807 may have virtually any cross-sectional shape (square, polygonal, non-polygonal, circular, rounded, angled, etc.) and the spacing therebetween may be virtually any size. There can be any number of walls, cylinders, or structures 807 (two or more as illustrated, three or more, four or more, five or more, six or more, etc.)

The one or more steps 804 may have one or more platforms 814. The one or more platforms 814 may be secured to the one or more step couplers 808 and may extend laterally away from the side bar 802 and/or step couplers 808. The platform 814 may have a top surface with one or more features 818 providing traction or anti-slip to provide tracking for a user when stepping on the platform 814. The one or more features 818 may be raised protrusions or projections, depressions, cutouts, ribs, channels, bumps, and the like.

The side bar 802 may have a length that extends between ends E1 and E2. The length may be substantially straight or the ends E1 and/or E2 may be curved relative to the middle M of the side bar 102. The ends E1 and/or E2 may follow a side profile of the vehicle, between the front and rear vehicle wheels 24, 26.

Figure 9A:
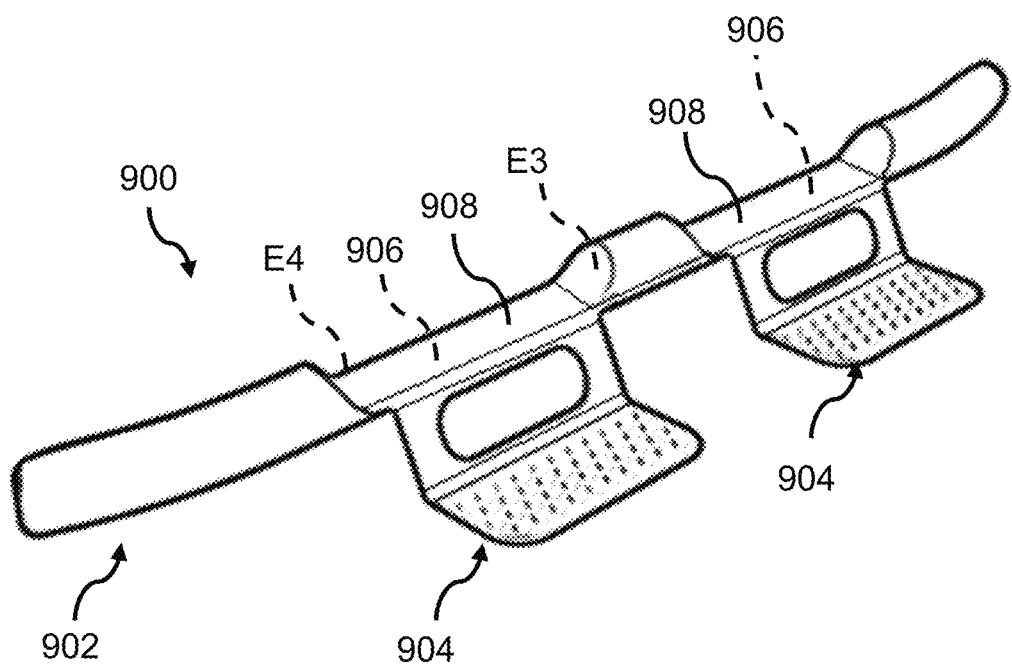
FIG. 9A is a perspective view of a step assembly.
Figure 9B:
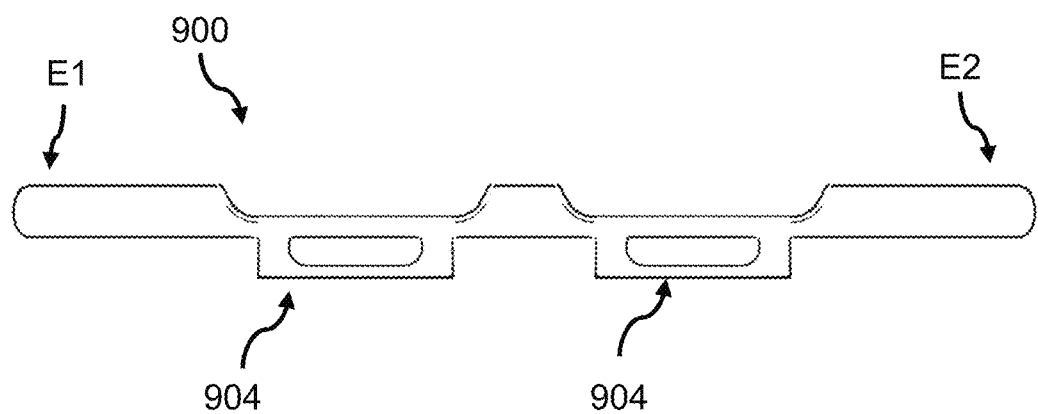
FIG. 9B is a front view of the assembly of FIG. 9A.

FIGS. 9A and 9B illustrate a step assembly 900. The step assembly 900 comprises a side bar 902 and one or more steps 904. The side bar 902 has one or more step attachment channels 906 (2 are illustrated). The one or more step attachment channels 906 may extend along an entire length of the side bar 902, or only along a portion of the length of the side bar 902 between ends E1, E2. The one or more step attachment channels 906 may be one or more recesses, notches, grooves, voids, depressions, scallops, or regions on the side bar 902 where the one or more steps may be attached or coupled to. The one or more step attachment channels 906 may be generally V or U-shaped, defined between ends E3, E4 thereof.

Each of the one or more steps 904 may include one or more step couplers 908. The step coupler 808 may be configured to slide into or be received in the one or more step attachment channels 906 to engage and couple the step 904 to the side bar 902. The one or more step couplers 908 may be the same size as the one or more step attachment channels 906. The one or more step couplers 908 may be smaller than the one or more step attachment channels 906 so that the one or more step couplers 908 can be positioned or slid within the one or more step attachment channels 906 in a lateral or forward and rearward direction of the vehicle (fore, aft) to move or position the one or more steps 904 in any desired position along a length of the side bar 902. This may advantageously allow a single step assembly 900 to be used for vehicles having various body styles, where doors may be located in different positions (i.e., single cab vehicle, vs. crew cab vehicle, vs. double cab vehicles, vs. extended cab vehicles, etc.). In some configurations, the one or more step couplers may be permanently attached to the one or more step attachment channels 906 or side bars 902 to restrict or prevent removal or separation of the one or more steps 904 and side bar 902. Such an attachment may comprise welding or other suitable more permanent fasteners. In some configurations, the one or more step couplers may be attached to the one or more step attachment channels 906 or side bars 902 such that the one or more steps can be removed, separated, and/or repositioned on the side bar 902. Such an attachment may comprise one or more bolts, screws, clamps, or the like fasteners.

Figure 10:
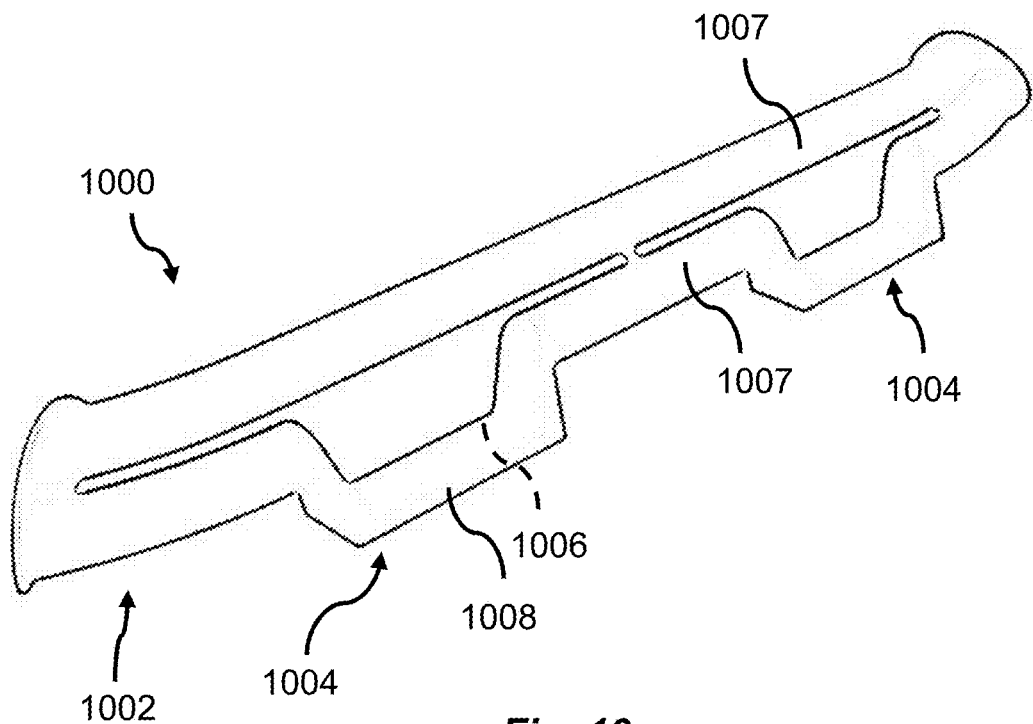
FIG. 10 is a perspective view of a step assembly.

FIG. 10 illustrates a step assembly 1000. The step assembly 1000 comprises a side bar 1002 and one or more steps 1004. The side bar 1002 has one or more step attachment channels 1006 (2 are illustrated). The one or more step attachment channels 1006 may extend along an entire length of the side bar 1002, or only along a portion of the length of the side bar 1002 between ends of the side bar 1002. The one or more step attachment channels 1006 may be one or more recesses, notches, grooves, voids, depressions, scallops, or regions on the side bar 1002 where the one or more steps may be attached or coupled to. The one or more step attachment channels 1006 may be generally V or U-shaped, defined between ends of the side bar 1002. The one or more step attachment channels 1006 may be regions of the side bar 1002 that are bent or formed into a U or V shaped channel and configured to receive support or engage the one or more step couplers 1008. The side bar 1002 may be comprised of one or more bar 1007. The top bar 1007 and/or the bottom bar 1007 may be secured to the vehicle, vehicle frame, and/or vehicle body.

Figure 11:
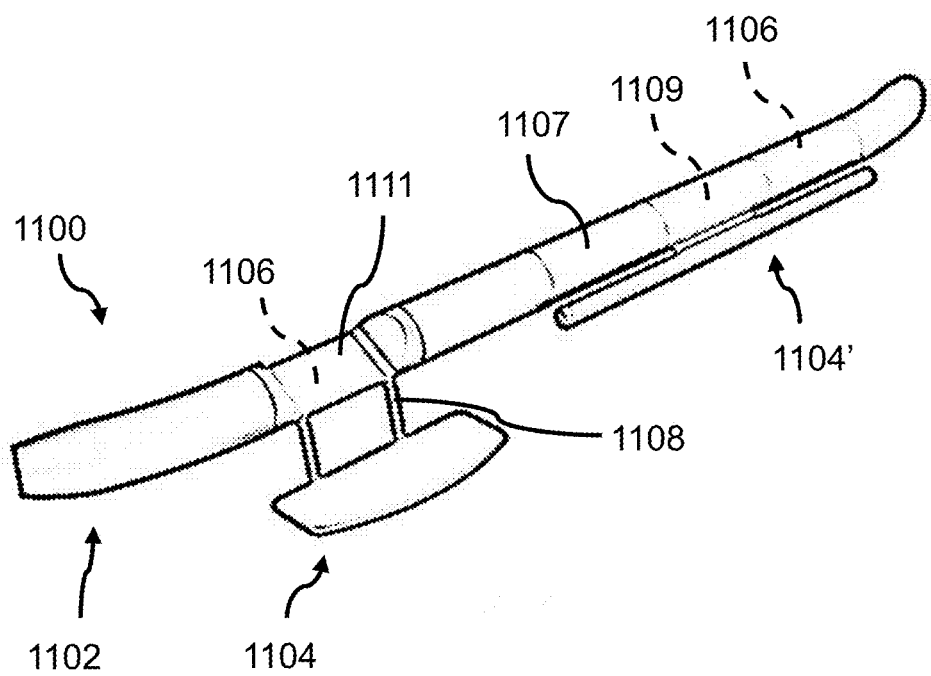
FIG. 11 is a perspective view of a step assembly.

FIG. 11 illustrates a step assembly 1100. The step assembly 1100 comprises a side bar 1102 and one or more steps 1104, 1104'. The side bar 1102 has one or more step attachment channels 1106. The one or more step attachment channels 1106 may extend along an entire length of the side bar 1002, or only along a portion of the length of the side bar 1102 between ends of the side bar 1102. The one or more step attachment channels 1106 may be one or more recesses, notches, grooves, voids, depressions, scallops, or regions on the side bar 1102 where the one or more steps may be attached or coupled to. The one or more step attachment channels 1106 may be generally V or U-shaped, defined between ends of the side bar 1102. The one or more step attachment channels 1106 may be regions of the side bar 1102 that are bent or formed into a U or V shaped channel and configured to receive support or engage the one or more step couplers 1108. The side bar 1100 may have one or more covers 1109 that cover of conceal the channel 1106. Alternatively, the recess from the channel 1106 may function as a second step 1111. The cover 1109 may also function as a second step 1111. FIG. 11 also shows that the step assembly may have two (or more) different steps.

Figure 12:
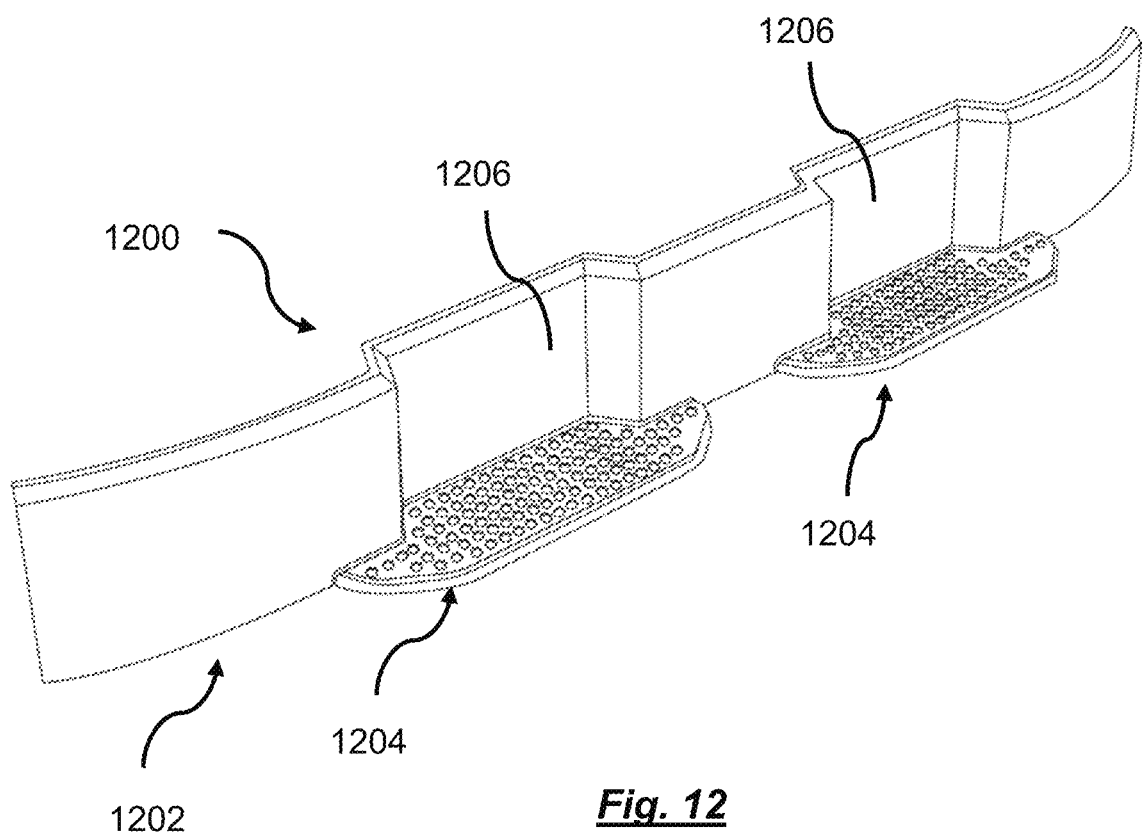
FIG. 12 is a perspective view of a step assembly.

FIG. 12 illustrates a step assembly 1200. The step assembly 1200 comprises a side bar 1202 and one or more steps 1204. The side bar 1202 has one or more step attachment channels 1206. The one or more step attachment channels 1206 may extend inwardly along an entire length of the side bar 1202, or only along a portion of the length of the side bar 1202 between ends of the side bar 1202. The one or more step attachment channels 1206 may be one or more recesses, notches, grooves, voids, depressions, scallops, or regions on the side bar 1202. The one or more steps 1204 may be connected to the side bar 1202 or to the one or more step attachment channels 1206. The one or more steps 1204 may be integrally formed with the side bar 1202 or attached thereto via one or more fasteners, welds, etc.

Figure 13A:
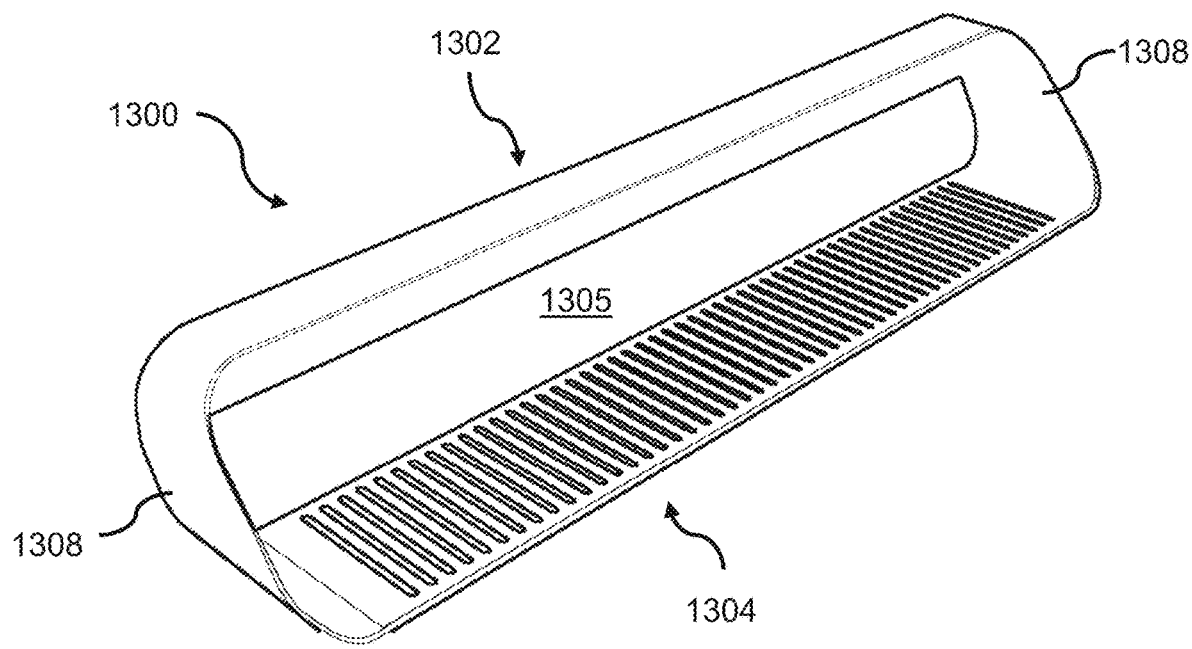
FIG. 13A is a perspective view of a step assembly.
Figure 13B:
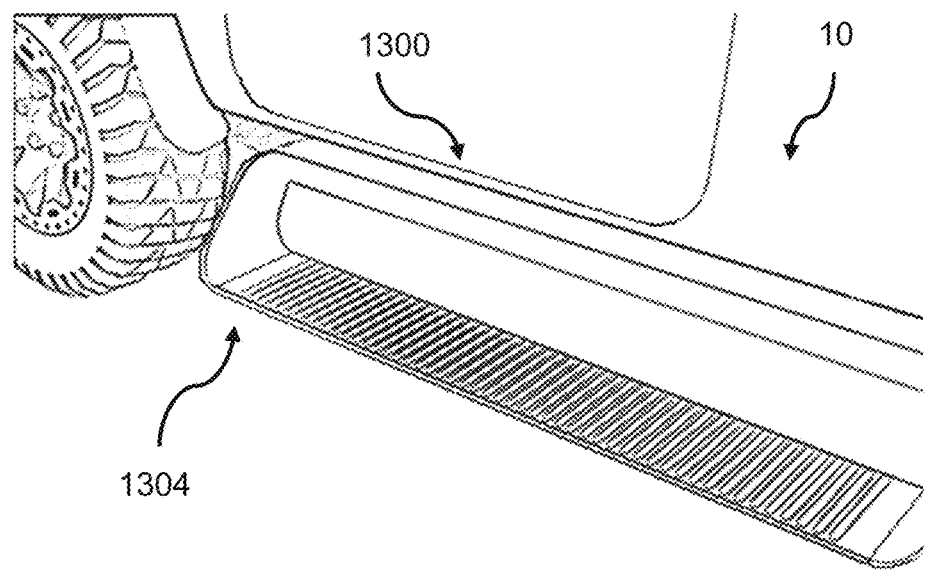
FIG. 13B is a perspective view of the assembly of FIG. 13A attached to a vehicle.

FIGS. 13A and 13B illustrate a step assembly 1300. The step assembly 1300 comprises a side bar 1302 and one or more steps 1304. Each of the one or more steps 1304 may include one or more step couplers 1308. In some configurations, the one or more step couplers may be permanently attached to the side bars 1302 to restrict or prevent removal or separation of the one or more steps 1304 and side bar 1302. Such an attachment may comprise welding or other suitable more permanent fasteners. In some configurations, the one or more step couplers 1308 may be attached to the side bars 1302 such that the one or more steps 1304 can be removed, separated, and/or repositioned on the side bar 1302. Such an attachment may comprise one or more bolts, screws, clamps, or the like fasteners.

The one or more steps 1304 may be generally parallel and offset from the side bar 1302. An opening 1305 may be provided between the side bar 1302 and step 1304 or a wall or plate may be provided therebetween. In FIG. 13B, the step assembly 1300 is illustrated attached to the vehicle 10.

Figure 14A:
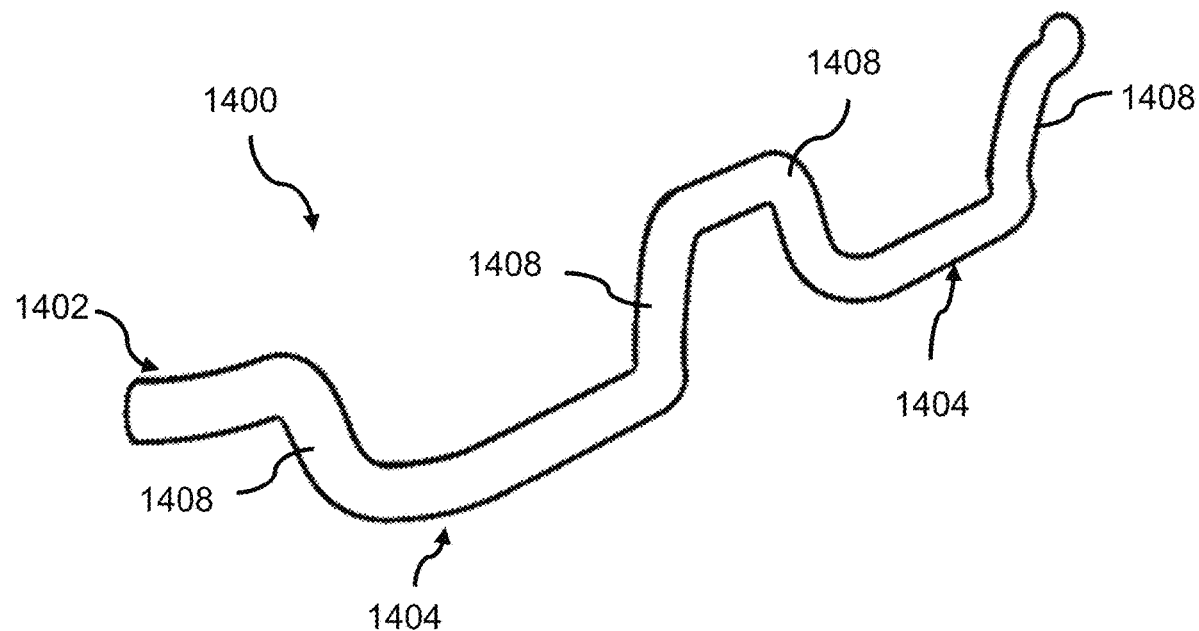
FIG. 14A is a perspective view of a step assembly.
Figure 14B:
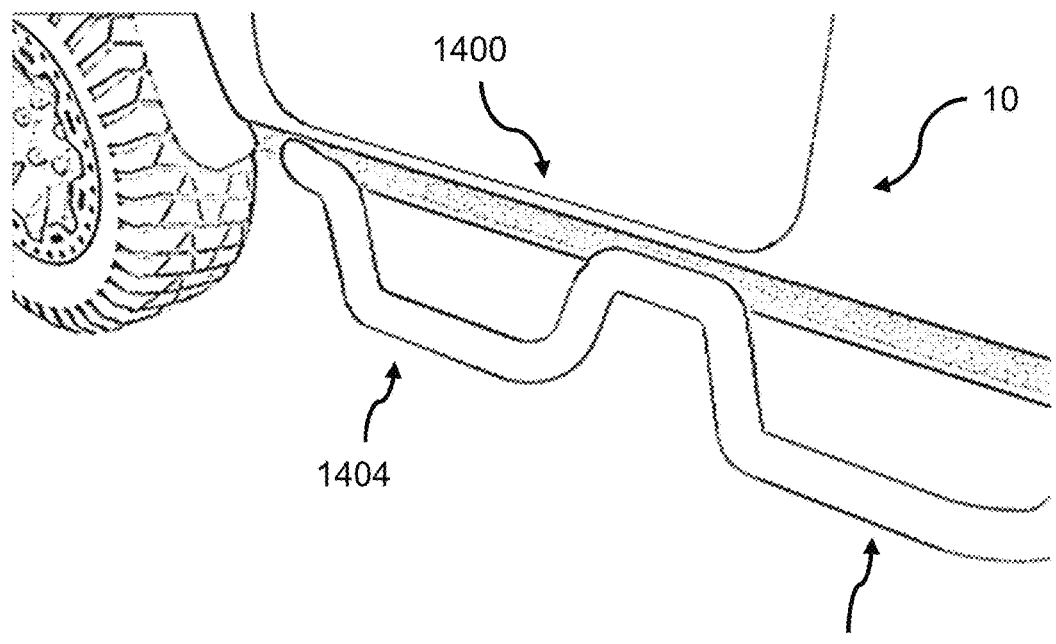
FIG. 14B is a perspective view of the assembly of FIG. 14A attached to a vehicle.

FIGS. 14A and 14B illustrate a step assembly 1400. The step assembly 1400 comprises a side bar 1402 and one or more steps 1404. The side bar 1402 may be formed or bent to include the one or more steps 1404. Alternatively, the one or more steps 1404 may be attached to the side bar 1402 through coopers 1408 via one or more fasteners like welds, bolts, screws, etc. In FIG. 14B, the step assembly 1400 is illustrated attached to the vehicle 10.

Figure 15A:
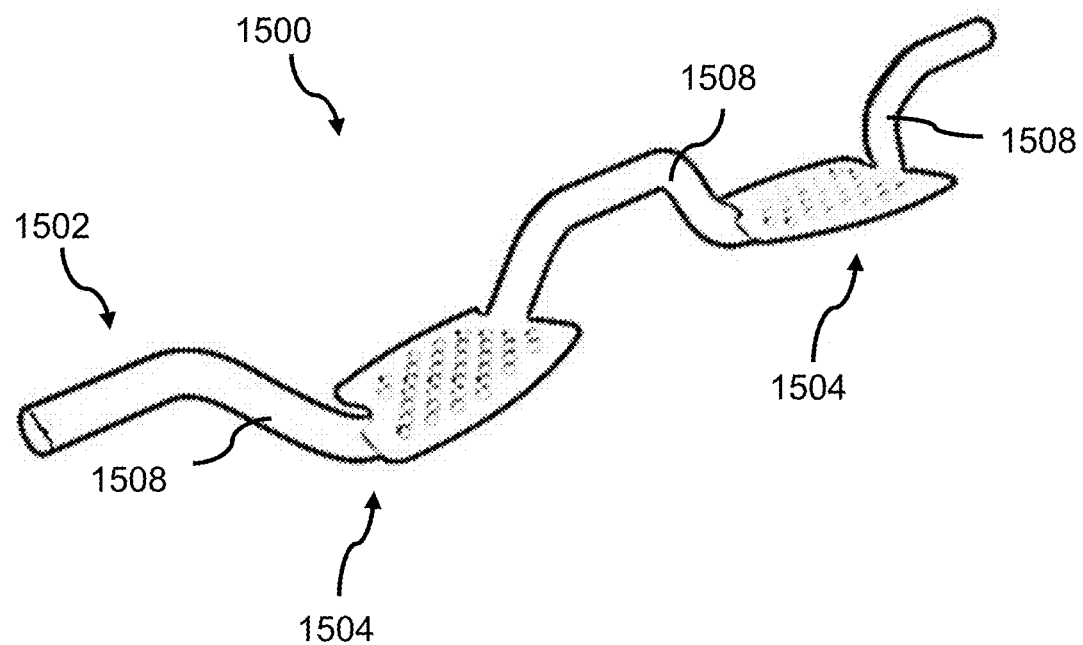
FIG. 15A is a perspective view of a step assembly.
Figure 15B:
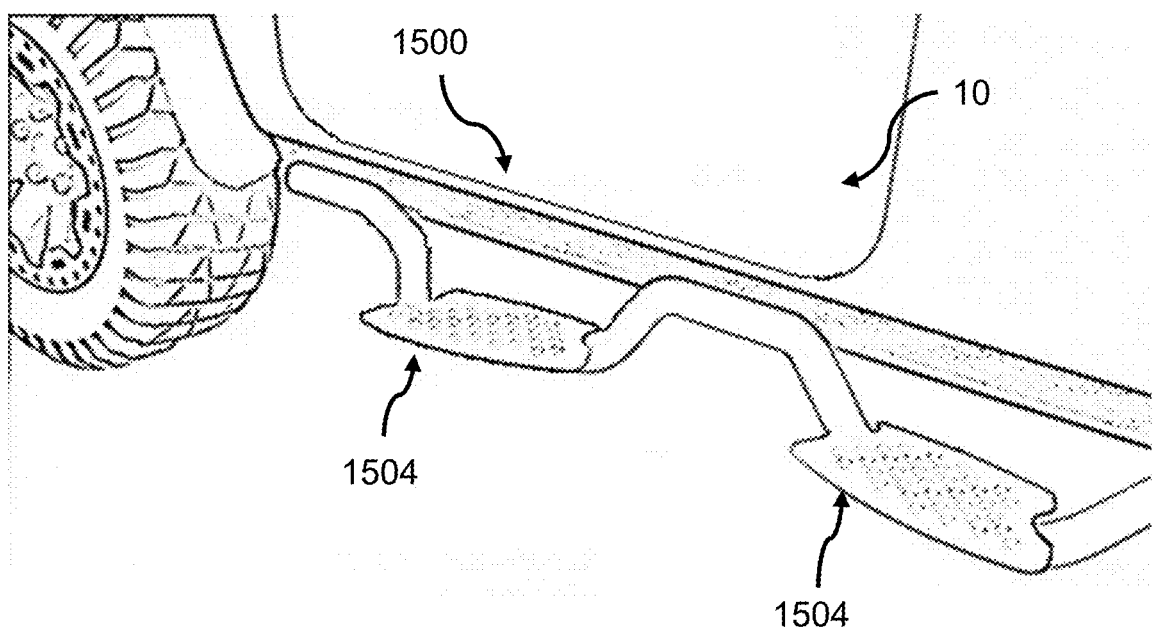
FIG. 15B is a perspective view of the assembly of FIG. 15A attached to a vehicle.

FIGS. 15A and 15B illustrate a step assembly 1500. The step assembly 1500 comprises a side bar 1502 and one or more steps 1504. The side bar 1502 may be formed or bent to include the one or more steps 1504. Alternatively, the one or more steps 1504 may be attached to the side bar 1502 through coopers 1508 via one or more fasteners like welds, bolts, screws, etc. In FIG. 15B, the step assembly 1500 is illustrated attached to the vehicle 10.

Figure 16:
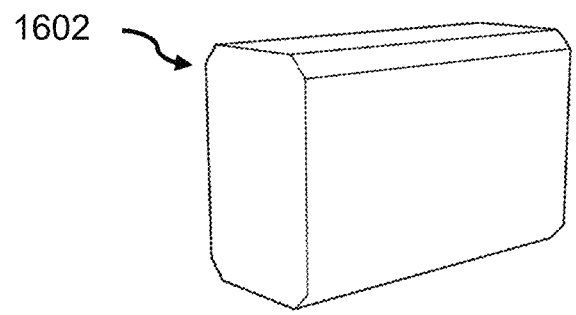
FIG. 16 is a partial cross-sectional view of a side bar.
Figure 17:
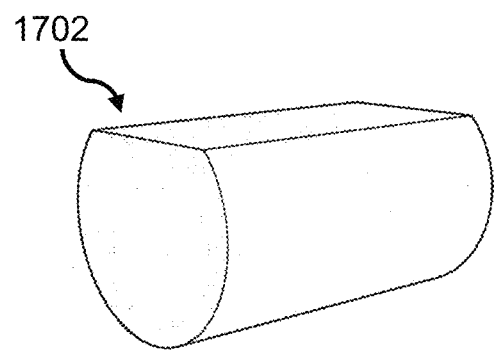
FIG. 17 is a partial cross-sectional view of a side bar.
Figure 18:
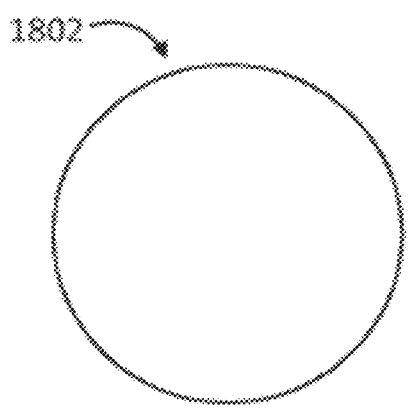
FIG. 18 is a partial cross-sectional view of a side bar.
Figure 19:
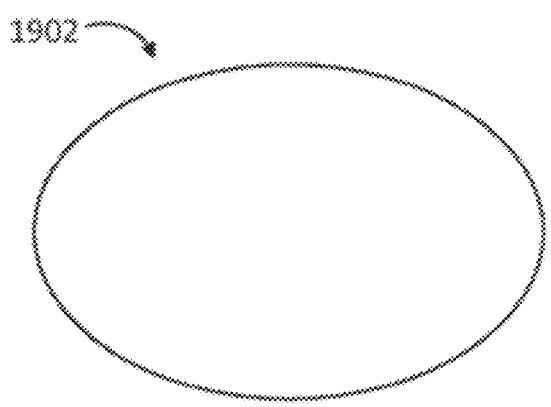
FIG. 19 is a partial cross-sectional view of a side bar.
Figure 20:
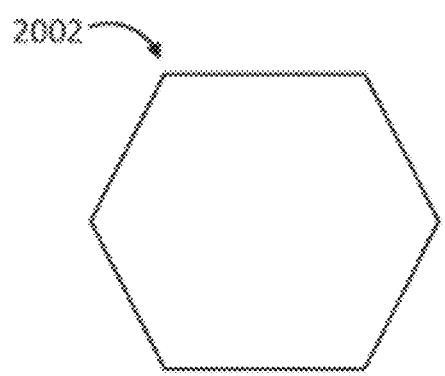
FIG. 20 is a partial cross-sectional view of a side bar.

FIGS. 16 and 17 show exemplary cross sections of the side bar 1602, 1702. In FIG. 16, the side bar 1602 includes four generally planar surfaces and in FIG. 17 the side bar 1702 includes one generally planar surface. It is understood that the side bar may include a cross section having any number of planar surfaces and curved surfaces along a length thereof. FIG. 18 shows a cross section of the side bar 1802 that is round or circular. FIG. 19 shows an oval cross section of the side bar 1902. FIG. 20 shows a cross section of the side bar 2002 that has a hexagon shape.

These teachings relate to a step assembly. The step assembly may assist a person with ingress and egress to and from a vehicle cabin of a motor vehicle; to and from a cargo area or bed of a motor vehicle; to and from a trailer that is to be pulled or towed by a motor vehicle; and the like.

The step assembly may be installed on the motor vehicle by the OEM manufacturer, and/or the step assembly may be installed as an after-market accessory. The step assembly may be installed or attached to the motor vehicle frame or body. In some configurations, the step assembly or parts thereof may be integrally formed with the vehicle frame or vehicle body. For example, the side bar may be integrally formed or permanently attached to the vehicle frame or vehicle body, and the one or more steps may be thus coupled to that portion of the vehicle frame and/or vehicle body. In some configurations, the one or more step attachment channels may be formed or machined directly into the vehicle frame and/or vehicle body and thus the one or more steps may directly engage the vehicle frame. In other configurations, the step assembly or parts thereof may be attached to the vehicle body and/or vehicle frame with one or more hangers, bolts, welds, clamps, or other like fasteners.

The motor vehicle may be virtually any vehicle. For example, the vehicle may be a car, a truck, a pickup truck, a sport utility vehicle (SUV), an all-terrain vehicle (ATV), utility terrain Vehicle (UTV), or the like. In some configurations, the motor vehicle may instead be a trailer and the step assembly may assist with ingress and egress into and from the trailer. For example, the trailer may be used for hauling goods like cargo, dirt, rocks, a boat, a jet-ski, snowmobiles, other vehicles, and the like.

The step assembly may include one or more side bars. A side bar may be configured to be attached to the vehicle, vehicle frame, and/or vehicle body via one or more welds, brackets, clamps, bolts, fasteners, and the like. In some configurations, the side bar may be integrally formed with the vehicle, vehicle frame, and/or vehicle body. For example, the side bar and one or more members of the vehicle frame may be the same. In some configurations, the one or more step attachment channels may be formed or machined directly into the vehicle frame and/or vehicle body and thus the one or more steps may directly engage the vehicle frame.

The side bar may extend along an entire length of the vehicle or only along a portion thereof. The side bar may be located forward in vehicle position of the front tires, between the front and rear tires, or rearward in vehicle position of the rear tires. In some configurations, the side bar may be located along the front of the vehicle (i.e., at or below the front bumper) or along the rear of the vehicle (i.e., at or below the rear bumper or tailgate). The side bar may be located at or below the front door (front driver or passenger door) and/or at or below the rear door (rear driver or passenger door). The side bar may be located below any door(s) of the vehicle. The side bar may be located below a trunk or hatch.

The side bar may be made of a suitable material, such as metal, plastic, a composite. For example, the side bar may be made of a metal, aluminum, steel, polypropylene, nylon, etc. The side bar may be extruded, injection molded, stamped, cast, printed, 3D printed etc.

The side bar may have any suitable cross section. For example, the side bar may have a cross section that is circular, oval, square, rectangular, polygonal, non-polygonal. The side bar may have a cross-section that varies along its length. For example, the cross section may transition from one or more: circular to square, polygonal, non-polygonal, rectangular, square, etc. or vice versa. The side bar may have a cross section that is hollow, solid, or at least partially hollow, or at least partially solid. The side bar may have an inner core that is made of a different material than an outer portion of the side bar. For example, the inner core may be made of a foam or filler and the outer surface may be made of metal or plastic.

The side bar may be an elongated beam or beam-like structure. The side bar may be generally straight or linear between the ends thereof. Alternatively, the side bar may have ends that are in a different plane or axis than a center of the side bar. The side bar may have a curve or sweep that follows or mirrors a side profile of the vehicle, vehicle frame, vehicle body.

The side bar may include one or more step attachment channels. The one or more step attachment channels may function to provide a region on the side bar for attaching the one or more steps. The one or more step attachment channels may provide a region for holding or supporting the one or more steps. The one or more step attachment channels may provide for the one or more steps to be moved or repositioned or translated along a length of the side bar, without completely disconnecting the steps from the side bar. In other words, the one or more steps, step couplers, or fingers may engage the one or more step attachment channels, while still allowing the one or more steps to be moved along a length of the one or more side bars. One or more securing mechanisms may be used to tighten or prevent movement of the one or more steps relative to the side bar after the step is in a desired location.

The one or more step attachment channels may extend along an axis that is generally parallel to or the same as a longitudinal axis of the side bar. The one or more step attachment channels may extend along an axis that is generally perpendicular to the longitudinal axis of the side bar. The one or more step attachment channels may extend at any angle relative to the longitudinal axis of the vehicle or side bar. The one or more step attachment channels may have any suitable cross section for receiving and engaging the step, step coupler, or step finger. The one or more step attachment channels may have a complementary shape of the shape of the step, step coupler, or step finger to allow a connection therebetween. For example, the step attachment channel may have a circular or square cross section and so would the finger or step coupler. For example, the step attachment channel may have a T-shaped or mushroom shape cross section and so does the step coupler or finger.

The one or more attachment channels may provide for the one or more steps to be attached or coupled to the side bar in a variety of positions. For example, the steps may be coupled to the one or more attachment channels so that the steps are lower or higher, relative to the ground. This may advantageously provide for the steps to be installed on vehicles having different road clearance heights to assist with egress to and from a vehicle cabin. The steps may be coupled to the one or more attachment channels so that the steps are located more forward or rearward, relative to a center of the side bar. This may advantageously provide for the steps to be installed on vehicles having different lengths or door positions to assist with egress to and from a vehicle cabin. The steps may be removed from the side bar when not in use. The steps may be removed from the side bar during conditions when maximum ground clearance is required, such as when traveling off-road or traversing obstacles such as trees, rocks, and the like.

The step assembly may have one or more steps. The one or more steps may have or provide a platform for a user to step on during ingress and egress to and from a vehicle cabin of a motor vehicle; to and from a cargo area or bed of a motor vehicle; to and from a trailer that is to be pulled or towed by a motor vehicle; and the like.

The one or more steps may be separable from the side bar, without causing damage to the side bar and/or the steps. In other words, the one or more steps may be separated from the side bar and then re-attached to the side bar (in the same location or in a different location) without affecting the structural integrity or performance of the side bar assembly, the side bar, and/or the step.

The one or more steps may include one or more step couplers. A step coupler may function to connect or attached (permanently or removably) the one or more steps to the side bar. Permanently means that the step cannot be separated from the side bar without causing destruction or affecting structural integrity of the step and/or side bar. Removably means that the step can be separated from the side bar without causing destruction or affecting structural integrity of the step and/or side bar and then re-attached or coupled to the side bar in the same or different location. A step coupler may connect a step platform to a step finger. A step coupler may extend between a step platform and a step finger. A step coupler may extend between the side bar, finger, and platform such that in vehicle position the step platform is at generally the same height as the side bar, below the side bar, or above the side bar.

The step or the one or more step couplers may include a ring. The ring may partially or entirely surround a circumference or perimeter of the cross section of the side bar.

The step may include a bridge. The bridge may function to add structure or rigidity to the step. The bridge may extend between two or more step couplers or rings. The bridge may be in contact with one or more surface of the side bar. The bridge may be spaced apart or elevated from the one or more surfaces of the side bar. The bridge may include only an upper bridge surface, only a lower bridge surface, or only one or more side surfaces (front and back bridge surfaces). In the event a cross section of the side bar is circular, then the bridge may cover or contact only a portion of the circumference or the entire circumference. For example, the bridge may contact or cover a segment of the circumference, for example 15 degrees or more, 30 degrees or more, 45 degrees or more 60 degrees or more, 90 degrees or more, 120 degrees or more, 150 degrees or more 180 degrees or more, 200 degrees or more 230 degrees or more, 250 degrees or more, 270 degrees or more, or even 360 degrees. The bridge may add structure or rigidity to maintain the distance or separation of the two or more opposing step couplers. For example, one or more of the step couplers may warp or bend due to post manufacturing issues, thermal exposure, or even use. The bridge may function to prevent such warp or bending. The bridge, for example the upper bridge may include one or more features for providing grip. The bridge or the upper bridge may also provide another function of providing a stepping surface for ingress and egress from the vehicle. The stepping surface may include one or more of the grip features disclosed herein. In some configurations, the bridge may extend only along the back side of the side bar, and would thus be hidden from view when looking at the side of the step assembly or vehicle. This may offer a more aesthetic look.

The one or more steps may include one or more step fingers. A step finger may function to connect or attached (permanently or removably) the one or more steps, step couplers, or step platform to the side bar. Permanently means that the step or finger cannot be separated from the side bar without causing destruction or affecting structural integrity of the step, finger and/or side bar. Removably means that the step or finger can be separated from the side bar without causing destruction or affecting structural integrity of the step, finger, and/or side bar and then re-attached or coupled to the side bar in the same or different location.

A step finger may be a bracket, a hook, a clamp, a cuff, or the like. A step finger may have a C-shaped cross section. A step finger may be inserted into one or more step attachment channels to engage the side bar. A step finger may be fastened to one or more of the structures that define the step attachment channels between two adjacent structures.

The one or more steps may have one or more securing mechanisms. A securing mechanism may function to secure, lock, or prevent the one or more steps from moving relative to the side bar. A securing mechanism may be temporary, meaning the securing mechanism can be temporarily locked and unlock so the steps can be secured from movement and prevent movement and then unsecured to allow movement or removability. A temporary securing mechanism advantageously allows a user to install the steps on the side bar and maintain their position during use. Then, when a user wishes to remove or reposition the one or more steps relative to the side bar, the securing mechanism may be manipulated (loosened, moved, etc.) to allow for movement of the step or removal of the step. The securing mechanism can then be once again manipulated to lock or secure the step in the same or new position on the side bar. A securing mechanism may be permanent, meaning the securing mechanism can be locked so the steps cannot be removed or separated from the side bar without destroying the structural integrity of the side bar and/or steps.

A securing mechanism may be any suitable mechanism, such as for example: one or more set screws, one or more clamps, one or more bolts and nuts, one or more adhesives, one or more hooks, hook and loop fasteners, spring loaded clamps, key locks (similar to a home door lock or deadbolt). A securing mechanism may be a rivet, weld, which may prevent the one or more steps to be separated or removed from the side bar. Such a securing mechanism may be provided after a user has installed the one or more steps in a desired location and no longer wishes to have the ability to remove or separate the one or more steps from the side bar.

The one or more securing mechanisms may be located anywhere on the one or more steps or engage any portion of the one or more steps, such as on the one or more step couplers, the one or more fingers, the one or more step platforms. The one or more securing mechanisms may be located where on the one or more side bars or engage any portion of the one or more steps, such as a front surface of the side bar (facing outwardly away from a center line of the vehicle), a top surface of the side bar (facing away from the ground in vehicle position), a back surface of the side bar (facing the vehicle body or vehicle frame when in vehicle position), or a bottom surface facing the ground in vehicle position). The one or more securing mechanism may be covered or concealed from view via one or more covers, plugs, shields, boots or features of the one or more steps to conceal the securing mechanism from view and/or to prevent damage thereto.

The one or more steps may have a step platform. A step platform may be a region of the steps that supports a user during with ingress and egress to and from a vehicle. A step platform may extend outwardly away from the side bar. A step platform may be positioned at generally the same height as the side bar, below the side bar, or above the side bar, depending on where the step, step coupler, or step fingers engage the side bar.

A step platform may have one or more features providing traction or anti-slip. The one or more features may be raised or recessed features, ribs, grooves, projections, grip, a roughened surface. The step platform may have one or more through holes or slits, to allow for water, dust, snow, sand, and other debris to fall from the step platform to prevent accumulation thereon.

It is understood that the following method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:
1. A step assembly comprising:
   a side bar configured to be coupled to a vehicle;
   a step comprising two step couplers that are spaced apart, each one of the two step couplers comprising a part that entirely encircles the side bar;

a platform that extends below and in between the two step couplers and configured for a user to step on to enter and exit the vehicle; and a bridge extending between and connecting the two parts that entirely encircle the side bar, the bridge is arranged above the platform.

2. The step assembly according to claim 1, wherein the bridge extends generally parallel to a length of the side bar and is in contact with one or more surfaces of the side bar.

3. The step assembly according to claim 1, wherein the step comprises a securing mechanism that secures the step to the side bar.

4. The step assembly according to claim 3, wherein the securing mechanism secures the bridge to the side bar.

5. The step assembly according to claim 3, wherein the bridge extends along a top surface of the side bar.

6. The step assembly according to claim 5, wherein the platform has a substantially planar surface, and the bridge comprises a substantially planar surface that is generally parallel to the substantially planar surface of the platform.

7. The step assembly according to claim 6, wherein the bridge comprises a housing that completely encircles the side bar in a region between the two step couplers.

8. The step assembly according to claim 6, wherein the bridge is an upper bridge and the step comprises a lower bridge that connects the two step couplers.

9. The step assembly according to claim 8, wherein the lower bridge extends along a bottom surface of the side bar, the bottom surface of the side bar opposes the top surface of the side bar.

10. The step assembly according to claim 9, wherein the step comprises an open space between the upper bridge and the lower bridge and between the two step couplers, the side bar is visible through the open space.

11. The step assembly according to claim 9, wherein the step comprises front and back bridge surfaces.

12. The step assembly according to claim 11, wherein upper bridge, the lower bridge, and the front and back bridge surfaces enclose the side bar between the two step couplers.

13. The step assembly according to claim 3, wherein the securing mechanism comprises a handle that is configured to be pivoted away from the step about a pin or hinge to lock or unlock the securing mechanism.

14. The step assembly according to claim 13, wherein the handle is located on the bridge.

15. The step assembly according to claim 13, wherein the handle is located on a front surface of the bridge.

16. The step assembly according to claim 1, wherein each of the two step couplers comprising an arm having an upper portion and a lower portion, the upper portion of each arm is connected to the part of the step that entirely encircles the side bar and the lower portion of each arm is connected to the platform.

17. The step assembly according to claim 16, wherein the step assembly comprises a securing mechanism that secures the bridge to the side bar and each of the step couplers are free of a securing mechanism.

18. A step assembly comprising:
I) a side bar configured to be coupled to a vehicle;
II) a first step comprising:
  a) two step couplers that are spaced apart, each one of which comprise a part that entirely encircles the side bar to attach the first step to the side bar;
  b) a platform that extends below and in between the two step couplers and configured for a user to step on to enter and exit the vehicle; and
  c) a bridge extending between and connecting the two parts that at least partially encircle the side bar, the bridge is arranged above the platform;
III) a second step comprising:
  a) two step couplers that are spaced apart, each one of which comprise a part that entirely encircles the side bar to attach the second step to the side bar;
  b) a platform that extends below and in between the two step couplers and configured for a user to step on to enter and exit the vehicle; and
  c) a bridge extending between and connecting the two parts that entirely encircle the side bar, the bridge is arranged above the platform.

19. The step assembly according to claim 18, wherein each of the two step couplers of the first comprise an arm having an upper portion and a lower portion, the upper portion of each arm is connected to the part of the first step that entirely encircles the side bar and the lower portion of each arm is connected to the platform.

20. The step assembly according to claim 19, wherein the first step comprises a securing mechanism that secures the bridge to the side bar and both of the step couplers are free of a securing mechanism.

* * * * *